(12) United States Patent
Lim

(10) Patent No.: US 8,650,508 B2
(45) Date of Patent: Feb. 11, 2014

(54) MOBILE TERMINAL AND OPERATING METHOD THEREOF

(75) Inventor: Gukchan Lim, Seoul (KR)

(73) Assignee: LG Electronics Inc., Seoul (KR)

(*) Notice: Subject to any disclaimer, the term of this patent is extended or adjusted under 35 U.S.C. 154(b) by 279 days.

(21) Appl. No.: 12/885,382

(22) Filed: Sep. 17, 2010

(65) Prior Publication Data
US 2011/0072345 A1    Mar. 24, 2011

(30) Foreign Application Priority Data
Sep. 18, 2009   (KR) ................... 10-2009-0088648

(51) Int. Cl.
G06F 3/033    (2013.01)
G06F 3/01     (2006.01)
G06F 3/02     (2006.01)
G06F 3/00     (2006.01)
G06F 3/041    (2006.01)

(52) U.S. Cl.
USPC .......... 715/863; 715/702; 715/761; 715/773; 715/784; 345/157; 345/169; 345/173

(58) Field of Classification Search
USPC .......... 715/702, 773, 784, 863; 345/157, 169, 345/173
See application file for complete search history.

(56) References Cited

U.S. PATENT DOCUMENTS

| | | | |
|---|---|---|---|
| 5,854,988 A * | 12/1998 | Davidson et al. | 701/50 |
| 7,870,496 B1 * | 1/2011 | Sherwani | 715/761 |
| 2006/0265653 A1 * | 11/2006 | Paasonen et al. | 715/704 |
| 2007/0205992 A1 * | 9/2007 | Gloyd et al. | 345/169 |
| 2008/0036743 A1 * | 2/2008 | Westerman et al. | 345/173 |
| 2008/0048990 A1 * | 2/2008 | Cho et al. | 345/173 |
| 2008/0165141 A1 * | 7/2008 | Christie | 345/173 |
| 2008/0174562 A1 * | 7/2008 | Kim | 345/173 |
| 2009/0024314 A1 * | 1/2009 | Kim | 701/200 |
| 2009/0094562 A1 * | 4/2009 | Jeong et al. | 715/863 |
| 2009/0278806 A1 * | 11/2009 | Duarte et al. | 345/173 |
| 2010/0095240 A1 * | 4/2010 | Shiplacoff et al. | 715/784 |
| 2010/0293500 A1 * | 11/2010 | Cragun et al. | 715/784 |

\* cited by examiner

*Primary Examiner* — Alvin Tan
*Assistant Examiner* — Rinna Yi
(74) *Attorney, Agent, or Firm* — Lee, Hong, Degerman, Kang & Waimey

(57) ABSTRACT

A mobile terminal is provided that includes a touch input unit and a display. A method of operating the mobile terminal includes operating the touch input unit of the mobile terminal in a normal mode, detecting a first multi-touch signal from the touch input unit, switching the touch input unit from the normal mode to a direction input mode in response to the first multi-touch signal, detecting a second multi-touch signal from the touch input unit while the touch input unit is in the direction input mode, determining a direction represented by the second multi-touch signal based on the tap signal, and scrolling at least one object displayed on a screen of a display of the mobile terminal in the determined direction. The second multi-touch signal may include a tap signal.

29 Claims, 21 Drawing Sheets

(a)

(b)

(a)                  (b)

MOBILE TERMINAL AND OPERATING METHOD THEREOF

Pursuant to 35 U.S.C. §119(a), this application claims the benefit of earlier filing date and right of priority to Korean Patent Application No. 10-2009-0088648, filed on Sep. 18, 2009 in the Korean Intellectual Property Office, the contents of which are hereby incorporated by reference herein in their entirety.

FIELD OF THE INVENTION

The present invention relates to a mobile terminal and an operating method thereof, and more particularly, to a mobile terminal capable of recognizing a multi-touch input and an operating method thereof.

DISCUSSION OF THE RELATED ART

Mobile terminals are portable devices that can provide users with various services, such as a voice calling service, a video calling service, an information input/output service, and a data storage service. In recent years, various attempts have been made to develop a variety of multimedia functions for mobile terminal hardware and software. As a result, some mobile terminals including input units capable of being manipulated simply by being touched have been developed.

Touch input units for mobile terminals simply recognize a single touch input and, thus, may not be able to maximize user convenience. Therefore, it is necessary to provide ways to effectively recognize not only a single touch input on a touch input unit, but also to recognize various multi-touch inputs.

SUMMARY OF THE INVENTION

The present invention is directed to a mobile terminal having a touch input unit capable of having various touch input modes. The present invention is also directed to an operating method of a mobile terminal having a touch input unit capable of receiving a multi-touch signal input.

According to an aspect of the invention, there is provided a method of operating a mobile terminal. The method includes operating a touch input unit of the mobile terminal in a normal mode, detecting a first multi-touch signal from the touch input unit switching the touch input unit from the normal mode to a direction input mode in response to the first multi-touch signal detecting a second multi-touch signal from the touch input unit while the touch input unit is in the direction input mode, determining a direction represented by the second multi-touch signal based on the tap signal, and scrolling at least one object displayed on a screen of a display of the mobile terminal in the determined direction. The second multi-touch signal includes a tap signal.

According to another aspect of the invention, there is provided a mobile terminal. The mobile terminal includes a display configured to display at least one object on a screen of the display a touch input unit configured to receive a touch input, and a controller configured to switch the touch input unit from a normal mode to a direction input mode in response to a first multi-touch signal detected from the touch input unit. The touch input unit is further configured to receive a second multi-touch signal while the touch input unit is in the direction input mode. The second multi-touch signal includes a tap signal. The controller is further configured to determine a direction represented by the second multi-touch signal based on the tap signal and to scroll the at least one object displayed on the screen of the display in the determined direction.

According to another aspect of the invention, there is provided a method of operating a mobile terminal. The method includes operating a touch input unit of the mobile terminal in a normal mode, detecting a first multi-touch signal from the touch input unit, switching the touch input unit from the normal mode to a direction input mode in response to the first multi-touch signal, detecting a second multi-touch signal from the touch input unit while the touch input unit is in the direction input mode, determining a direction represented by the second multi-touch signal based on a direction of the drag signal, and scrolling at least one object displayed on a screen of a display of the mobile terminal in the determined direction or moving a cursor on the screen of the display in the determined direction. The second multi-touch signal includes a drag signal.

According to another aspect of the invention, there is provided a mobile terminal. The mobile terminal includes a display configured to display at least one object on a screen of the display, a touch input unit configured to receive a touch input, and a controller configured to switch the touch input unit from a normal mode to a direction input mode in response to a first multi-touch signal detected from the touch input unit. The touch input unit is further configured to receive a second multi-touch signal while the touch input unit is in the direction input mode. The second multi-touch signal includes a drag signal. The controller is further configured to determine a direction represented by the second multi-touch signal based on a direction of the drag signal and to scroll the at least one object displayed on the screen of the display in the determined direction or to move a cursor on the screen of the display in the determined direction.

According to another aspect of the invention, there is provided a method of operating a mobile terminal. The method includes operating a touch input unit of the mobile terminal in a normal mode, detecting a first multi-touch signal from the touch input unit, switching the touch input unit from the normal mode to a direction input mode in response to the first multi-touch signal, detecting a second multi-touch signal from the touch input unit while the touch input unit is in the direction input mode, determining a direction represented by the second multi-touch signal based on the tap signal, and moving a cursor on the screen of the display in the determined direction. The second multi-touch signal includes a tap signal.

According to another aspect of the invention, there is provided a mobile terminal. The mobile terminal includes a display configured to display at least one object on a screen of the display, a touch input unit configured to receive a touch input, and a controller configured to switch the touch input unit from a normal mode to a direction input mode in response to a first multi-touch signal detected from the touch input unit. The touch input unit is further configured to receive a second multi-touch signal while the touch input unit is in the direction input mode. The second multi-touch signal includes a tap signal. The controller is further configured to determine a direction represented by the second multi-touch signal based on the tap signal and to move a cursor on the screen of the display in the determined direction.

BRIEF DESCRIPTION OF THE DRAWINGS

The accompanying drawings, which are included to provide further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts. As used herein, the suffixes 'module' and 'unit' are used for elements in order to facilitate the disclosure only. Therefore, significant meanings or roles are not given to the suffixes themselves and it is understood that the suffixes 'module' and 'unit' can be used together or interchangeably.

Mobile terminals described herein can include a mobile phone, a smart phone, a laptop computer, a digital broadcast terminal, a PDA (personal digital assistants), a PMP (portable multimedia player), and a navigation system. Except for cases applicable to mobile terminals only, it will be apparent to those of ordinary skill in the art that the configurations described herein are also applicable to stationary terminals, such as digital TVs and desktop computers.

Figure 1:
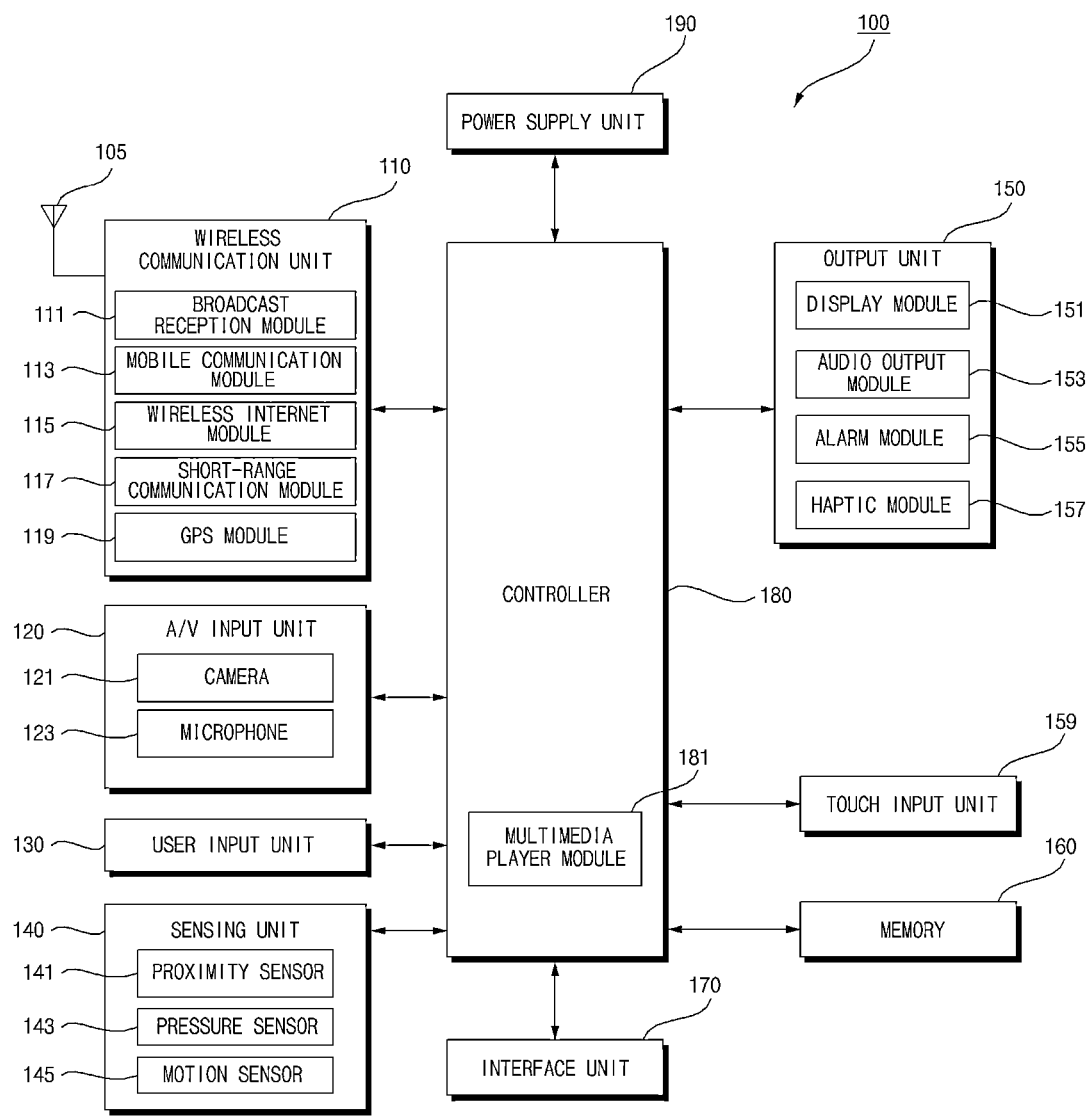
FIG. 1 is a block diagram of a mobile terminal according to an embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a touch input unit 159, a memory 160, an interface unit 170, a controller 180 and a power supply unit 190. Although FIG. 1 shows the mobile terminal 100 having various components, it is understood that implementing all of the illustrated components is not a requirement. More or fewer components may alternatively be implemented.

The wireless communication unit 110 may include one or more components that permit wireless communication between the mobile terminal 100 and a wireless communication system or network within which the mobile terminal 100 is located. For example, the wireless communication unit 110 may include a broadcast reception module 111, a mobile communication module 113, a wireless Internet module 115, a short-range communication module 117, and a global positioning system (GPS) module 119.

The broadcast reception module 111 receives a broadcast signal and/or broadcast associated information from an external broadcast managing server via a broadcast channel. The broadcast channel may include a satellite channel and/or a terrestrial channel. The broadcast signal and/or broadcast associated information received by the broadcast reception module 111 may be stored in a suitable storage device, such as in the memory 160.

The external broadcast managing server generally refers to a server that generates and transmits a broadcast signal and/or broadcast associated information or a server that is provided with a previously generated broadcast signal and/or broadcast associated information. The broadcast managing server then transmits the provided signal or information to the mobile terminal 100.

The broadcast signal may be implemented as a TV broadcast signal, a radio broadcast signal, a data broadcast signal, or other known type of signal. If desired, the broadcast signal may include a broadcast signal combined with a TV or radio broadcast signal.

The broadcast associated information includes information associated with a broadcast channel, a broadcast program, or a broadcast service provider. The broadcast associated information can be provided via a mobile communication network, in which case the broadcast associated information can be received by the mobile communication module 113.

The broadcast associated information can be implemented in various forms. For example, broadcast associated information may include an electronic program guide (EPG) of digital multimedia broadcasting (DMB) and an electronic service guide (ESG) of digital video broadcast-handheld (DVB-H).

The broadcast reception module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast reception module 111 can be configured to be suitable for other broadcasting systems as well as the above-explained digital broadcasting systems. The broadcast signal or the broadcast-related information received by the broadcast reception module 111 may be stored in the memory 160.

The mobile communication module 113 transmits/receives wireless signals to/from one or more network entities (e.g., base station, external terminal or server). Such wireless signals may represent, for example, audio, video, and data according to text/multimedia message transceivings.

The wireless Internet module 115 supports Internet access for the mobile terminal 100. The wireless Internet module 115 may be internally or externally coupled to the mobile terminal 100. The wireless Internet technology can include WLAN (Wireless LAN), Wi-Fi, Wibro (Wireless broadband), Wimax (World Interoperability for Microwave Access), HSDPA (High Speed Downlink Packet Access), or other types of known wireless Internet technology.

The short-range communication module 117 facilitates relatively short-range communications. Suitable technologies for implementing the short-range communication module 117 include radio frequency identification (RFID), infrared data association (IrDA), ultra-wideband (UWB), as well at the networking technologies commonly referred to as Bluetooth® and ZigBee®.

The GPS module 119 identifies or otherwise obtains the location of the mobile terminal 100. The GPS module 119 may receive position information from a plurality of GPS satellites.

With continued reference to FIG. 1, the audio/video (A/V) input unit 120 may be configured to provide audio or video signal input to the mobile terminal 100. As shown, the A/V input unit 120 includes a camera 121 and a microphone 123.

The camera 121 receives and processes image frames of still pictures or video, which are obtained by an image sensor in a video call mode or a photographing mode. The processed image frames can be displayed on a display module 151. The image frames processed by the camera 121 can be stored in the memory 160 or can be externally transmitted via the wireless communication unit 110. Optionally, at least two cameras 121 can be provided in the mobile terminal 100.

The microphone 123 receives an external audio signal while the mobile terminal 100 is in a particular mode, such as phone call mode, recording mode or voice recognition mode. The external audio signal is processed and converted into electric audio data. The processed audio data is transformed into a format transmittable to a mobile communication base station via the mobile communication module 113 when in a call mode. The microphone 123 typically includes assorted noise removing algorithms to remove noise generated in the course of receiving the external audio signal.

Figure 2:
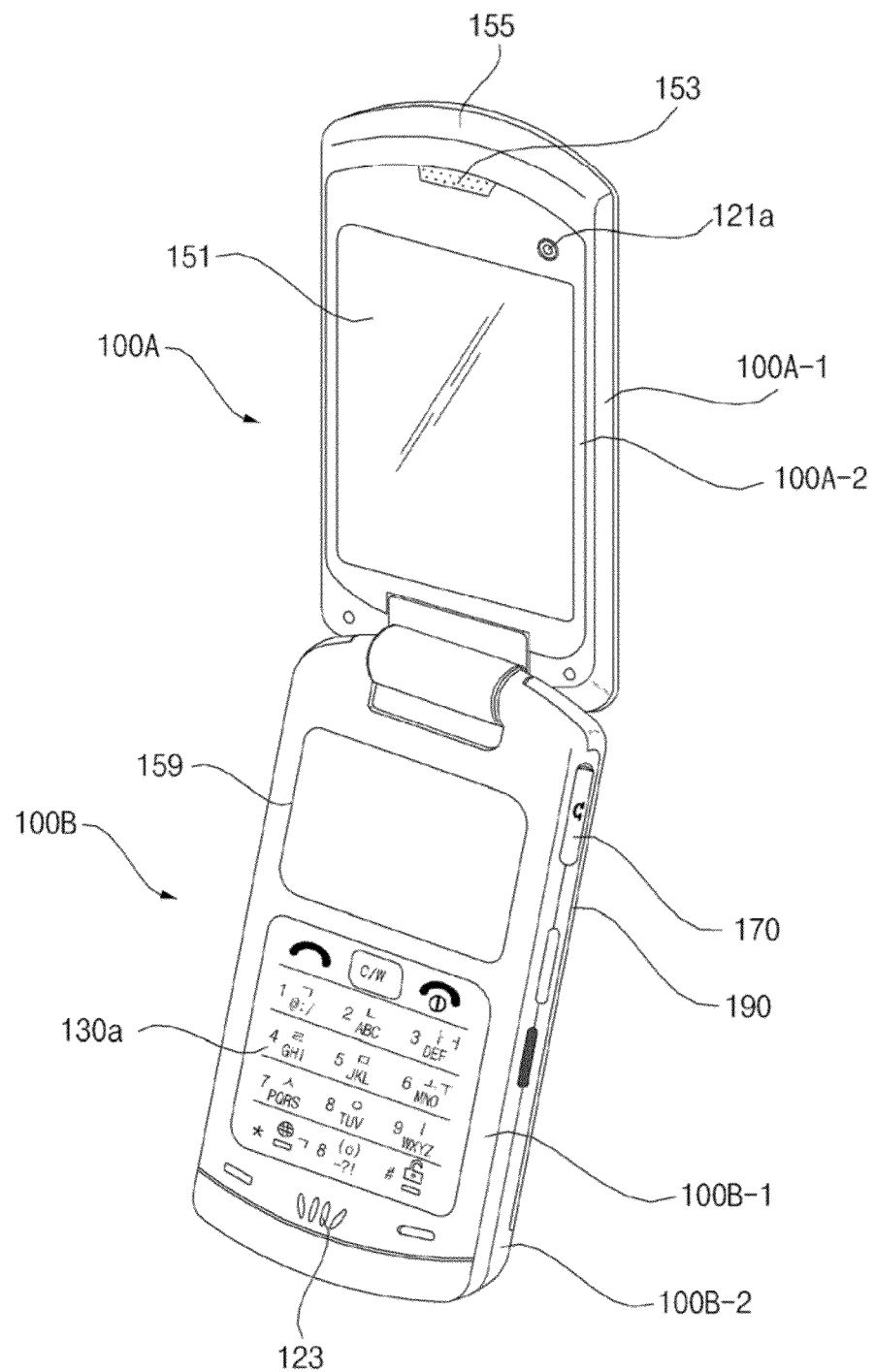
FIG. 2 is a front perspective view of the mobile terminal shown in FIG. 1.
Figure 3:
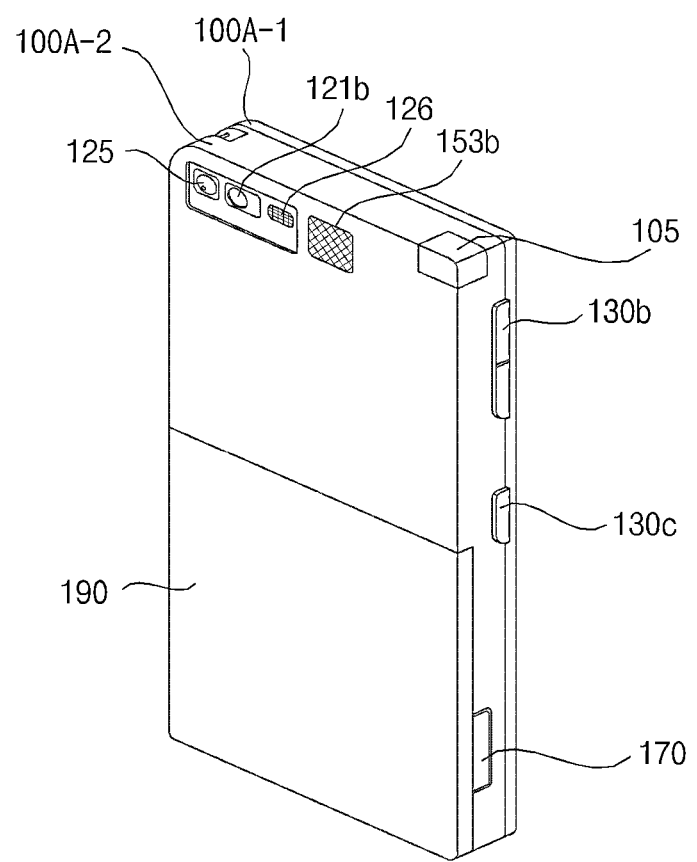
FIG. 3 is a rear perspective view of the mobile terminal shown in FIG. 2.

The user input unit 130 generates input data in response to user manipulation of an associated input device or devices. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen and may be used as both an input device and an output device. As depicted in FIGS. 2 and 3, the user input unit 130 may include user inputs 130a, 130b and 130c.

The sensing unit 140 provides sensing signals for controlling operations of the mobile terminal 100 using status measurements of various aspects of the mobile terminal 100. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation of the mobile terminal 100 or acceleration/deceleration of the mobile terminal 100.

As an example, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by the power supply unit 190 and the presence or absence of a coupling or other connection between the interface unit 170 and an external device.

The sensing unit 140 may include a proximity sensor 141, a pressure sensor 143 and a motion sensor 145. The proximity sensor 141 may determine whether there is an object nearby and/or approaching the mobile terminal 100 without any physical contact with the entity. More specifically, the proximity sensor 141 may detect an object that is nearby and/or approaching the mobile terminal 100 by detecting a change in an alternating magnetic field or the rate of change of static capacitance. The sensing unit 140 may include two or more proximity sensors 141.

The pressure sensor 143 determines whether pressure is applied to the mobile terminal 100 or measures the level of pressure, if any, applied to the mobile terminal 100. The pressure sensor 143 may be installed in a certain part of the mobile terminal 100 where pressure sensing is necessary. As an example, the pressure sensor 143 may be installed in the display module 151.

When the pressure sensor 143 is installed in the display module 151, the mobile terminal 100 can differentiate a typical touch signal from a pressure touch signal, which is generated using a higher pressure level than the pressure level used to generate a typical touch signal, based on data provided by the pressure sensor 143. Additionally, when a pressure touch signal is received through the display module 151, the mobile terminal 100 can determine the level of pressure applied to the display module 151 upon the detection of a pressure touch signal based on data provided by the pressure sensor 143.

The motion sensor 145 may determine the location and motion of the mobile terminal 100 using an acceleration sensor or a gyro sensor. Acceleration sensors are configured to convert vibrations related to acceleration into electric signals. With recent developments in micro-electromechanical system (MEMS) technology, acceleration sensors have been widely used in various products for various purposes ranging from detecting large motions, such as in automobile collisions as performed in automobile airbag systems, to detecting minute motions, such as the motion of the hand as performed in gaming input devices.

In general, one or more acceleration sensors representing two or three axial directions are incorporated into a single package. There are cases where the detection of only one axial direction, for example, a Z-axis direction, is necessary. Thus, when an X-axis or Y-axis acceleration sensor, instead of a Z-axis acceleration sensor, is required, the X-axis or Y-axis acceleration sensor may be mounted on an additional substrate, and the additional substrate may be mounted on a main substrate.

Gyro sensors measure angular velocity. Gyro sensors may determine the relative direction of rotation of the mobile terminal 100 in comparison to a reference direction.

The output unit 150 may be configured to output audio signals, video signals, alarm signals and touch signals. The output unit 150 may include the display module 151, an audio output module 153, an alarm module 155, and a haptic module 157.

The display module 151 is typically implemented to visually display (output) information associated with the mobile terminal 100. For example, if the mobile terminal 100 is operating in a phone call mode, the display 151 will generally provide a user interface (UI) or graphical user interface (GUI) that includes information associated with placing, conducting, and terminating a phone call. As another example, if the mobile terminal 100 is in a video call mode or a photographing mode, the display module 151 may additionally or alternatively display images that are associated with these modes, the UI or the GUI.

When the display module 151 is implemented as a touch screen, the display module 151 may include a touch screen panel and a touch screen panel controller. The touch screen panel may be a transparent panel attached to an exterior of the display module 151 and may be connected to an internal bus of the mobile terminal 100. The touch screen panel continuously monitors whether the touch screen panel is touched by the user.

When a touch signal is received via the touch screen panel, the touch screen panel transmits a number of signals corresponding to the touch signal to the touch screen panel controller. The touch screen panel controller processes the signals transmitted by the touch screen panel and transmits the processed signals to the controller 180. The controller 180 then determines whether a touch signal has been received and which part of the touch screen panel has been touched based on the processed signals transmitted by the touch screen panel controller.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional (3D) display. The mobile terminal 100 may include one or more of such displays.

The audio output module 153 outputs audio data received by the wireless communication unit 110 during a call reception mode, a call mode, a recording mode, a voice recognition mode, or a broadcast reception mode or may output audio data stored in the memory 160. In addition, the audio output module 153 may output various sound signals associated with the functions of the mobile terminal 100, such as receiving a call or a message. The audio output module 153 may include a speaker, a buzzer, other audio producing devices and combinations thereof.

The alarm module 155 outputs an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal.

More specifically, the alarm module 155 may output vibration upon receiving a call signal or a message. In addition, the alarm module 155 may receive a key signal and may output vibration as feedback to the key signal. In this manner, the user may easily recognize the occurrence of an event based on vibration output by the alarm module 155. An alarm signal for notifying the user of the occurrence of an event may be output not only by the alarm module 155 but also by the display module 151 or the audio output module 153.

The haptic module 157 generates various tactile effects that can be sensed by a user. Vibration is a representative tactile effect generated by the haptic module 157. Strength and pattern of the vibration generated by the haptic module 157 are controllable. For example, different vibrations can be output by being synthesized together or can be output in sequence.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by generating heat or cold using a device capable of absorbing heat or generating heat.

The haptic module 157 may be configured to enable the user to recognize a haptic effect using the kinesthetic sense of the fingers or the arms. The mobile terminal 100 may include two or more haptic modules 157.

The touch input unit 159 receives information by being touched. The touch input unit 159 detects a touch signal using a pressure-sensitive method, a capacitive method and/or an inductive method.

The touch input unit 159 may be implemented as a touch screen in which a touch pad and a display form a layer structure together. In this case, the touch input unit 159 may be used as both an input device and an output device, and may include a touch screen panel and a touch screen panel controller. The touch screen panel may be a transparent panel attached onto the exterior of the touch input unit 159 and connected to an internal bus of the mobile terminal 100. The touch screen panel continuously monitors whether the touch screen panel is touched by the user.

When a touch signal is received, the touch screen panel transmits a number of signals corresponding to the touch signal to the touch screen panel controller. The touch screen panel controller processes the signals transmitted by the touch screen panel and transmits the processed signals to the controller 180. The controller 180 then determines whether a touch signal has been received and which part of the touch screen panel has been touched based on the processed signals transmitted by the touch screen panel controller.

The memory 160 stores various programs necessary for the operation of the controller 180. Additionally, the memory 160 may temporarily store various data such as a phonebook, messages, still images or moving images.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., secure digital (SD) memory, extreme digital (XD) memory), or other similar memory or data storage device. The mobile terminal 100 may operate in association with web storage for performing a storage function of the memory 160 on the Internet.

The interface unit 170 may interface with an external device that can be connected to the mobile terminal 100. The interface unit 170 may be a wired/wireless headset, an external battery charger, a wired/wireless data port, an audio input/output (I/O) terminal, a video I/O terminal, an earphone or a card socket for a memory card, a subscriber identification module (SIM) card or a user identity module (UIM) card.

The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is wirelessly connected to an external device, the interface unit 170 may process signals transmitted by the external device. Examples of the external device include a remote control for controlling the mobile terminal 100.

The controller 180 controls the general operation of the mobile terminal 100. For example, the controller 180 may perform various control operations regarding making/receiving a voice call, transmitting/receiving data, or making/receiving a video call. The controller 180 may control the general operation of the mobile terminal 100 in accordance with signals transmitted by a remote control and then processed by the interface unit 170.

The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 provides power required by the various components for the mobile terminal 100. The power may be internal power, external power, or combinations thereof.

The exterior structure of the mobile terminal 100 will hereinafter be described in detail with reference to FIGS. 2 and 3. FIG. 2 is a front perspective diagram of the mobile terminal 100 shown in FIG. 1, and FIG. 3 is a rear perspective diagram of the mobile terminal 100 shown in FIG. 2. In FIGS. 2 and 3, like reference numerals indicate like elements, and thus, detailed descriptions thereof will be omitted.

The exterior of the mobile terminal 100 will hereinafter be described using a folder-type mobile phone as an example. However, the present invention is not restricted to a folder-type mobile phone. Rather, the present invention can be applied to various mobile phones, other than a folder-type mobile phone.

Referring to FIG. 2, the mobile terminal 100 includes a first body 100A and a second body 100B that are rotatably coupled together. The mobile terminal 100 may be opened by lifting the first body 100A relative to the second body 100B and closed by rotating the first body 100A back toward the second body 100B. In the closed condition (not shown), the first body 100A and the second body 100B overlap each other. However, in the open condition an inner face of the first body 100A and an inner face of the second body 100B are exposed, as shown in FIG. 2.

When the mobile terminal 100 is closed, the mobile terminal generally operates in a standby mode and may be released from the standby mode in response to user manipulation. When the mobile terminal 100 is open, the mobile terminal 100 may generally operate in a call mode and may be switched to the standby mode either manually, in response to user manipulation, or automatically, after the lapse of a predefined amount of time.

With continued reference to FIG. 2, the exterior of the first body 100A may be defined by a first front case 100A-1 and a first rear case 100A-2. Various electronic devices may be installed in the space formed by the first front case 100A-1 and the first rear case 100A-2. One or more middle cases (not shown) may be provided between the first front case 100A-1 and the first rear case 100A-2. The first front case 100A-1, the first rear case 100A-2 and the middle cases may be formed of synthetic resin through molding or may be formed of wood or a metallic material such as stainless steel (STS) or titanium (Ti).

The display module 151, a first audio output module 153a, and a first camera 121a may be disposed at the front of the first front case 100A-1. The display module 151 may include, for example, an LCD or an OLED display, which can display information. If a touch pad is configured to overlap the display module 151 to form a layer structure, the display module 151 may serve as a touch screen and allow the user to input various information to the mobile terminal 100 by touching the display module 151.

The first audio output module 153a may be implemented as a receiver or a speaker. The first camera 121a may be configured for capturing a still or moving image of the user.

The exterior of the second body 100B may be defined by a second front case 100B-1 and a second rear case 100B-2. The touch input unit 159 and a first user input module 130a may be disposed at the front of the second front case 100B-1. Second and third user input modules 130b and 130c (FIG. 3), the microphone 123 and the interface unit 170 may be disposed at the second front case 100B-1 or the second rear case 100B-2.

The first through third user input modules 130a through 130c may be referred to collectively as the user input unit 130. The user input unit 130 may adopt various manipulation methods as long as they provide tactile feedback to the user.

The user input unit 130 may be implemented as a dome switch or a touchpad capable of receiving commands or information by being pushed or touched, a wheel, a jog shuttle or joystick. The first user input module 130a may be used to enter such commands as 'start,' 'end,' or 'scroll' or to choose an operating mode in which the mobile terminal 100 is to operate. The second and third user input modules 130b and 130c may be used as hot keys for activating certain functions of the mobile terminal 100.

The microphone 123 may be configured to receive the user's voice or other sounds.

Referring to FIG. 3, a second camera 121b may be positioned at the rear of the second rear case 100B-2 of the second body 100B. The second camera 121b may have a different photographing direction from that of the first camera 121a shown in FIG. 2. Additionally, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a flash module 126 may be disposed near the second camera 121b. The mirror 125 may be used for the user to take a self-portrait. The flash module 126 may be used to illuminate a subject when the user attempts to capture an image of the subject with the second camera 121b.

A second audio output module 153b may be provided in the second rear case 100B-2. The second audio output module 153b may provide a stereo function in conjunction with the first audio output module 153a. The second audio output module 153b may also be used in a speaker-phone mode.

A broadcast receiving antenna 105 may be provided on one side of the second rear case 100B-2. The broadcast receiving antenna 105 may be installed such that it may be pulled out of the second rear case 100B-2.

The second camera 121b, the broadcast receiving antenna 105, and the flash module 126, which have been described as being provided in the first rear case 100B-2, may alternatively be provided in the first front case 100A-1. The first camera 121a may be configured to be rotatable to cover the photographing direction of the second camera 121b. In this case, the second camera 121b may be optional.

Figure 4:
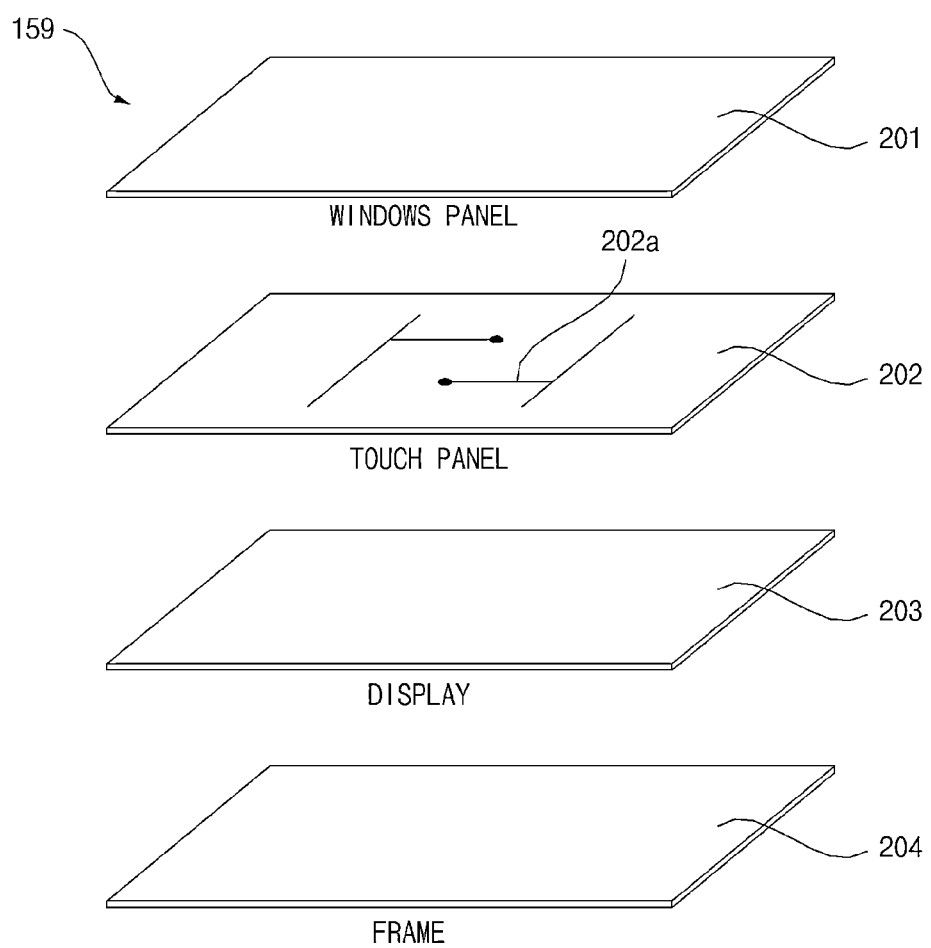
FIG. 4 depicts a structure of a touch input unit shown in FIG. 1.

FIG. 4 depicts the structure of the touch input unit 159. Referring to FIG. 4, the touch input unit 159 may include a frame 204, a display 203 disposed on the frame 204, a touch panel 202 disposed on the display 203 and a window panel 201 disposed on the touch panel 202.

The display 203 may display various information processed by the mobile terminal 100 and various UIs or GUIs for different operating states of the mobile terminal 100. The display 203 may include an LCD, a TFT-LCD, an OLED display, a flexible display or a 3D display.

The display 203 of the touch input unit 159 may serve as an auxiliary display module of the mobile terminal 100. Thus, when a main screen or a main menu is displayed on the display module 151, a sub-screen of the main screen or a sub-menu of the main menu may be displayed on the display 203 of the touch input unit 159.

The touch panel 202 may include a touch pattern 202a including indium tin oxide (ITO) electrodes that enable the touch panel 202 to detect whether the window panel 201 is being touched. When a touch signal is received, the touch panel 202 may transmit signals corresponding to the received touch signal to a touch screen panel controller (not shown). The touch screen panel controller processes the signals provided by the touch panel 202 and transmits the processed signals to the controller 180. The controller 180 may determine whether a touch signal has been received and which part of the window panel 201 has been touched in connection with the received touch signal based on the processed signals provided by the touch screen panel controller.

The window panel 201 is formed of a transparent material such as transparent acrylic or glass. The window panel 201 may protect the touch panel 202 and the display 203 and allow data displayed on the display 203 to be seen therethrough.

Figure 5:
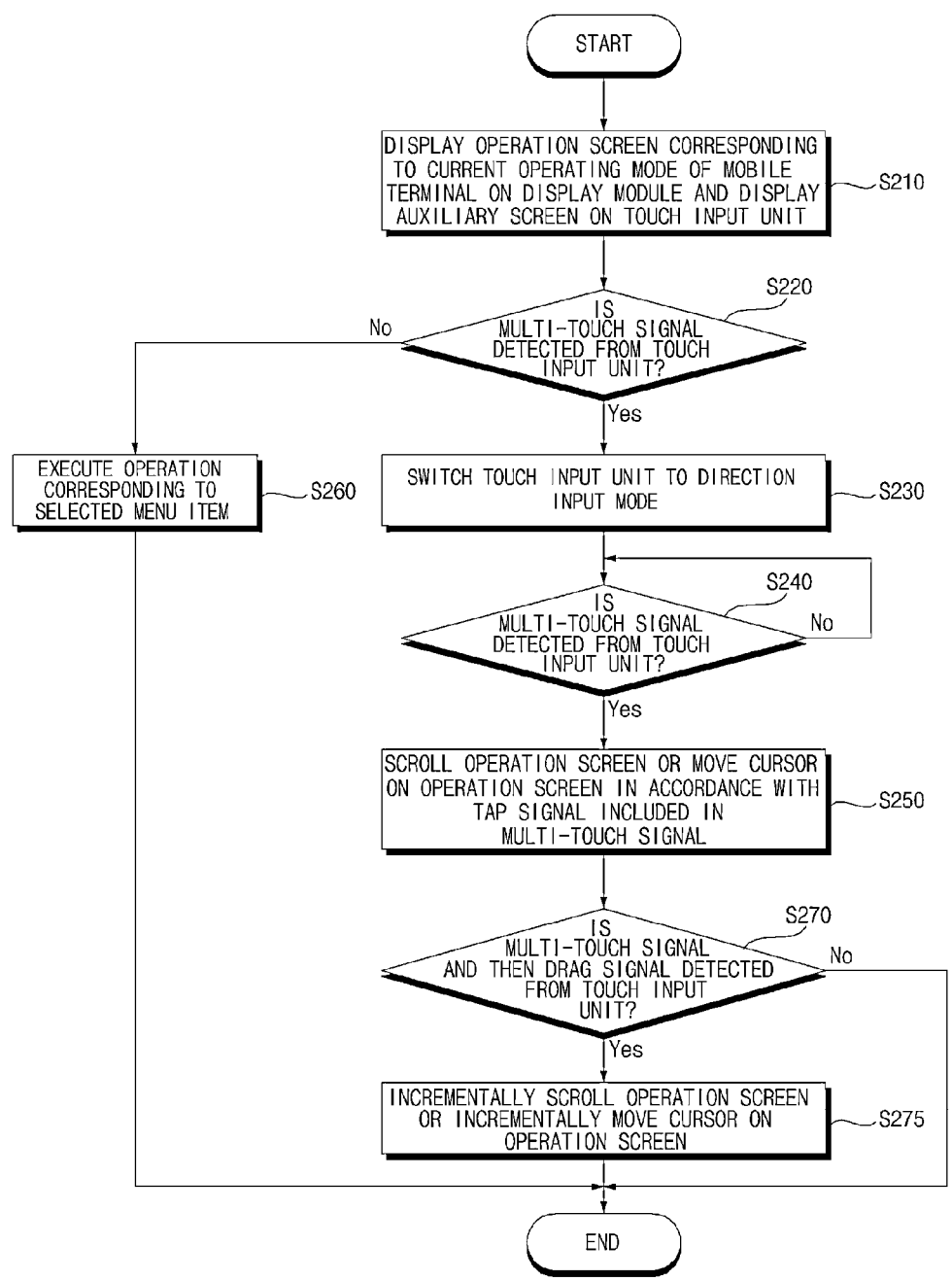
FIGS. 5 through 8 are flowcharts of operating methods of a mobile terminal according to an embodiment of the present invention.

FIGS. 5 through 8 depict flowcharts of operating methods of a mobile terminal 100 according to an embodiment of the present invention. FIG. 5 depicts an operation of the mobile terminal 100 in response to a multi-touch signal input via the touch input unit 159. Referring to FIG. 5, a screen, such as an operation screen, corresponding to a current operating mode of the mobile terminal 100 is displayed on a display, such as the display module 151, and the touch input unit 159 operates in a normal mode (S210). When the touch input unit 159 is a touch screen, an auxiliary screen of the operation screen may be displayed on the touch input unit 159. For example, if an idle screen is displayed on the display module 151, a basic menu, a user-set menu or a most-frequently-used menu may be displayed on the touch input unit 159 as a selectable item, such as a command input key, an image or an icon.

When a multi-touch is detected from the touch input unit 159 when the touch input unit 159 operates in the normal mode or when the auxiliary screen is displayed on the touch input unit 159 (S220), the controller 180 switches the touch input unit 159 from the normal mode to a direction input mode (S230). The direction input mode may be a mode for inputting a direction, such as up, down, left or right. When the touch input unit 159 is a touch screen, a direction input menu for inputting a direction may be displayed on the display of the touch input unit 159.

When a touch is detected from the touch input unit 159, the controller 180 may display a touch mark at the detection location of the touch, and may control vibration to be generated at the detection location of the touch. If another multi-touch signal including multiple touches is detected from the touch input unit 159 (S240), the controller 180 determines a location of each of the touches of the multiple touches and determines a direction represented by the multiple touch signals based on whichever of the multiple touches corresponds to a tap signal.

More specifically, the controller 180 may classify a touch signal into a long touch signal or a short touch signal and may identify a series of short touch signals detected from the same position on the touch input unit 159 as a tap signal. For example, if two touch signals are detected from left and right sides, respectively, of the touch input unit 159 and the touch signal detected from the left side of the touch input unit 159 is determined to be a tap signal, the controller 180 may determine that the two touch signals represent a right-to-left direction, and may scroll the operation screen or move a cursor on the operation screen in a leftward direction (S250).

If the two touch signals represent a rightward direction, the controller 180 may scroll the operation screen to the right or move the cursor in a rightward direction on the operation screen. If the two touch signals represent an upward direction, the controller 180 may scroll the operation screen upwardly or move the cursor in an upward direction on the operation screen. If the two touch signals represent a downward direction, the controller 180 may scroll the operation screen downwardly or move the cursor in a downward direction on the operation screen.

When the direction input menu is displayed on the touch input unit 159 in response to a multi-touch signal, a direction-guide image indicating a direction represented by the multi-touch signal may be displayed on the touch input unit 159. If a touch signal generated by touching the touch input unit 159 is received, the operation screen may be scrolled toward the detection location of the received touch signal. For example, four arrows representing four directions, such as up, down, left and right, may be displayed on the touch input unit 159. If one of the four arrows is touched, the operation screen may be scrolled in a direction represented by the touched arrow.

If the operation screen displayed on the display module 151 changes, a screen on the touch input unit 159 may change accordingly.

If a multi-touch signal including a drag signal is detected from the touch input unit 159 when the touch input unit 159 operates in the direction input mode (S270), the controller 180 determines a direction represented by the drag signal, and incrementally scrolls the operation screen or incrementally moves the cursor on the operation screen in the determined direction (S275). For example, if the multi-touch signal represents an upward direction, the controller 180 incrementally scrolls the operation screen in an upward direction or moves the cursor upwardly on the operation screen by an amount corresponding to a drag distance corresponding to the drag signal.

If a touch signal is detected from the touch input unit 159 when an auxiliary menu screen or a user-set menu screen corresponding to the operation screen is displayed on the touch input unit 159, the controller 180 executes an operation corresponding to a menu item displayed at the detected location of the touch signal, and displays a screen relevant to the menu item on the display module 151 (S260). For example, if a plurality of command keys are displayed on the touch input unit 159 and one of the command keys is selected via a touch signal, the controller 180 performs an operation corresponding to the selected command key and displays a screen relevant to the operation on the display module 151.

Figure 6:
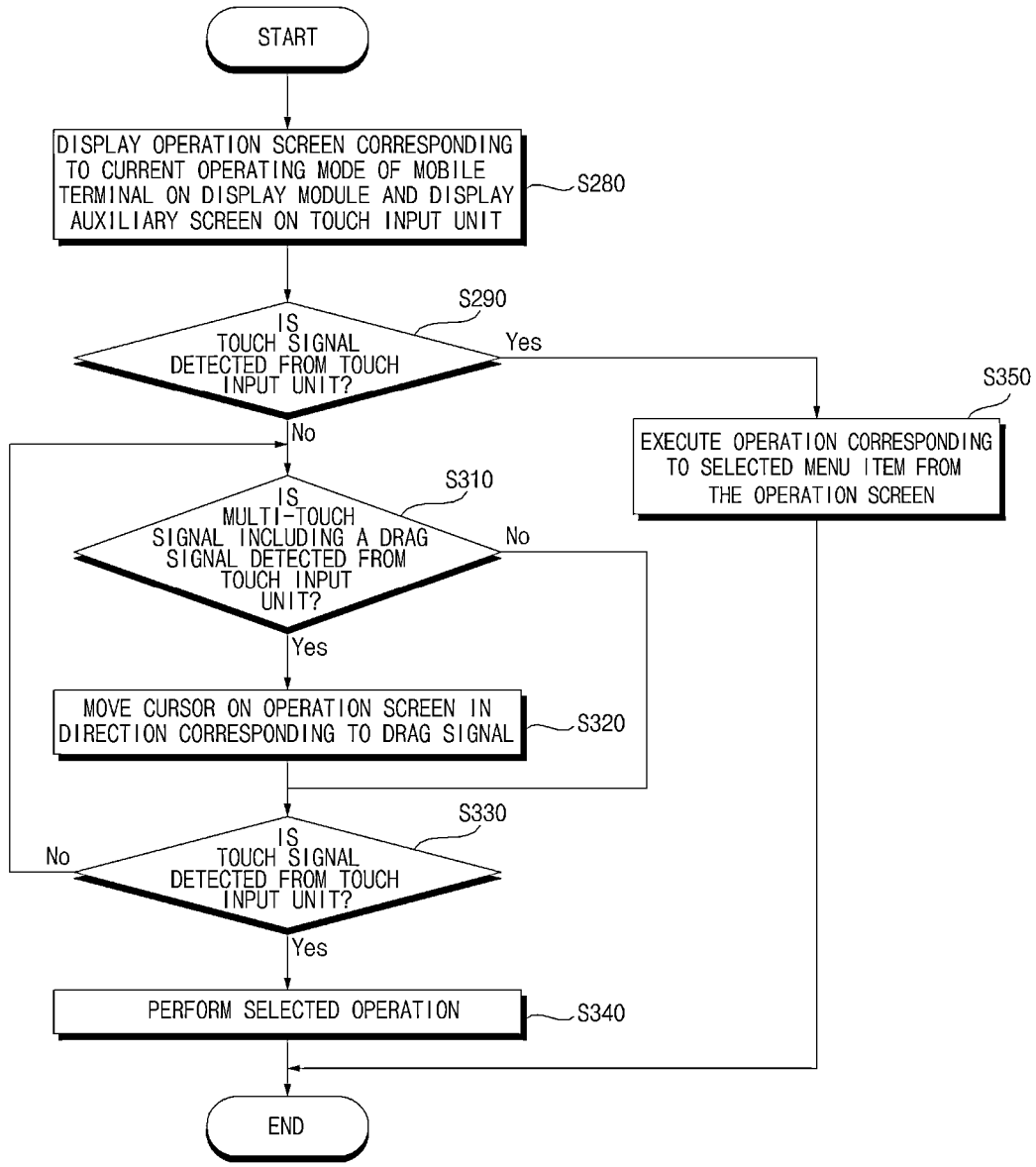

FIG. 6 depicts an operation of the mobile terminal 100 in response to a drag signal input via the touch input unit 159. Referring to FIG. 6, an operation screen corresponding to a current operating mode of the mobile terminal 100 is displayed on the display module 151 and an auxiliary menu screen or a user-set menu screen relevant to the operation screen displayed on the display module 151 is displayed on the touch input unit 159 (S280).

If a touch signal is detected from the touch input unit 159 (S290), the controller 180 selects a menu item from the operation screen, executes an operation corresponding to the selected menu item, and displays a screen relevant to the selected menu item on the display module 151 (S350). If a multi-touch signal is detected from the touch input unit 159, the controller 180 may switch the touch input unit 159 to the direction input mode.

If a multi-touch signal including a drag signal is detected from the touch input unit 159 (S310), the controller 180 moves a cursor on the operation screen in a direction corresponding to the detected drag signal (S320). In this manner, the touch input unit 159 may serve as a mouse, a touchpad or a tablet connected to a computer or a notebook computer and may enable the cursor on the operation screen to be moved in accordance with detected touch and drag signals. If the touch input unit 159 is a touch screen, an auxiliary screen may be displayed on the touch input unit 159.

If another touch signal is detected from the touch input unit 159 (S330), the controller 180 performs an operation corresponding to a selectable item, such as an icon or a command key, currently being pointed at by the cursor on the operation screen (S340), and displays a screen relevant to the operation on the display module 151. For example, if an icon or a command key is selected in response to a touch signal input received at the touch input unit 159, the controller 180 may display a still image, a moving image or content corresponding to the touched icon or command key on the display module 151, or may perform an operation corresponding to the touched icon or command key.

If a multi-touch signal including a tap signal is detected from the touch input unit 159, the controller 180 may determine a direction represented by the multi-touch signal based on the tap signal, and may scroll the operation screen or move the cursor on the operation screen in the determined direction.

Figure 7:
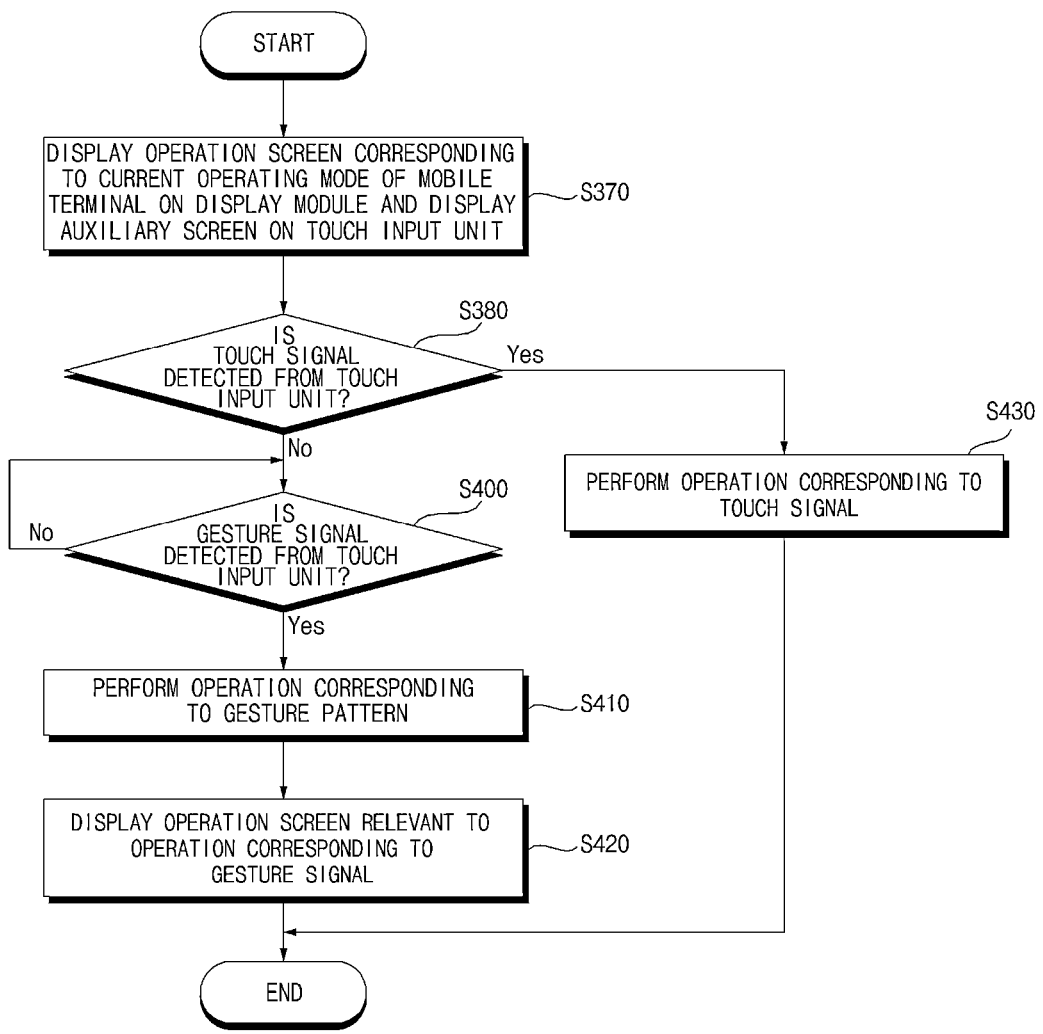

FIG. 7 depicts a flowchart showing an operation of the mobile terminal 100 in response to a gesture signal input thereto via the touch input unit 159. Referring to FIG. 7, an operation screen corresponding to a current operating mode of the mobile terminal 100 is displayed on the display module 151, and an auxiliary menu screen or a user-set menu screen relevant to the operation screen may be displayed on the touch input unit 159 (S370).

If a touch signal is detected from the touch input unit 159 (S380), the controller 180 switches the operating mode of the touch input unit 159. Additionally, if the touch input unit 159 is a touch screen, an auxiliary screen may be displayed on the touch input unit 159.

If a gesture signal involving a touch and drag with a certain preset pattern is detected from the touch input unit 159 (S400), the controller 180 recognizes the pattern of the gesture signal and performs a predefined operation corresponding to the recognized gesture pattern (S410). A plurality of gesture patterns and a plurality of operations to be performed corresponding to the plurality of gesture patterns may be registered in advance.

The controller 180 may display the type or pattern of gesture corresponding to the gesture signal on the touch input unit 159 or the display module 151. Thereafter, the controller 180 displays an operation screen relevant to the predefined operation corresponding to the gesture signal on the display module 151 (S420).

If a multi-touch signal including a tap signal is detected from the touch input unit 159, the controller 180 may determine a direction represented by the multi-touch signal based on the tap signal, and may scroll the operation screen or move a cursor on the operation screen in the determined direction. On the other hand, if a touch signal, instead of a gesture signal, is detected from the touch input unit 159 (S380), the controller 180 may perform an operation corresponding to the touch signal (S430). Alternatively, the controller may withdraw a menu corresponding to the touch signal from the touch input unit 159 and display the withdrawn menu on the display module 151.

Figure 8:
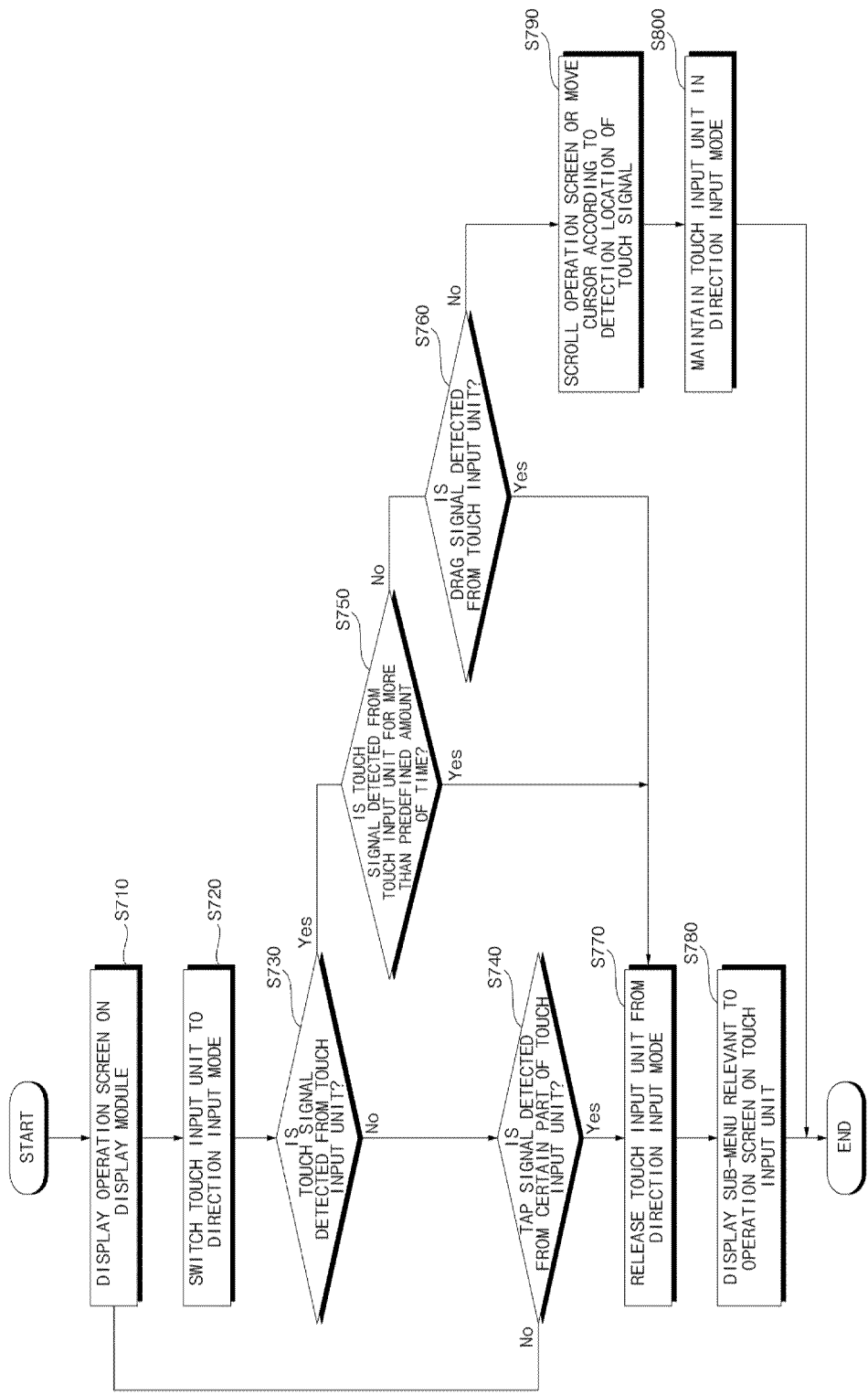

FIG. 8 depicts a flowchart showing an operation of releasing the touch input unit 159 from the direction input mode. Referring to FIG. 8, the controller 180 displays an operation screen corresponding to an operation currently being performed on the display module 151 (S710). The touch input unit 159 operates in the direction input mode in response to a multi-touch (S720). More specifically, if the mobile terminal 100 has begun operating immediately after being powered on, the touch input unit 159 may display an auxiliary menu or a user-set menu relevant to the operation screen and may be switched to the direction input mode in response to a multi-touch signal input.

The controller 180 determines whether a touch signal has been detected from the touch input unit 159 (S730). If it is determined that a touch signal is detected from the touch input unit 159, the controller 180 determines whether the touch signal has been detected for more than a predefined amount of time (S750).

If it is determined that the touch signal is detected from the touch input unit 159 for more than the predefined amount of time, the controller 180 releases the touch input unit 159 from the direction input mode (S770). The controller 180 may then display a sub-menu, such as an auxiliary menu or a user-set menu relevant to the operation screen, on the touch input unit 159 (S780).

If it is determined in operation S750 that the touch signal has not been detected from the touch input unit 159 for the predefined amount of time, the controller 180 determines whether a drag is detected from the touch input unit 159 (S760). If it is determined that a drag is detected from the touch input unit 159, the controller 180 releases the touch input unit 159 from the direction input mode (S770).

If it is determined in operation S730 that no touch signal is detected from the touch input unit 159, the controller 180 determines whether a tap signal is detected from the touch input unit 159 (S740). If it is determined in operation S740 that a tap signal is detected from the touch input unit 159, the controller 180 releases the touch input unit 159 from the direction input mode (S770).

If it is determined in operation S760 that no drag is detected from the touch input unit 159, the controller 180 locates a touch point on the touch input unit 159 where the touch signal is detected and scrolls the operation screen or moves a cursor on the operation screen to a point corresponding to the touch point (S790). More specifically, if a plurality of direction keys or direction guide images are displayed on the touch input unit 159 and a touch signal for selecting one of the direction keys or direction guide images is detected from the touch input unit 159, the controller 180 scrolls the operation screen or moves the cursor on the operation screen in a direction represented by the selected direction key or direction guide image (S790) and the touch input unit 159 is maintained in the direction input mode (S800).

If a multi-touch signal is detected from the touch input unit 159, the controller 180 determines a direction represented by the multi-touch signal and may scroll the operation screen or move the cursor on the operation screen in the determined direction.

FIGS. 9a through 9d depict diagrams of screens that can be displayed on the touch input unit 159 during operation of the mobile terminal 100.

An operation screen corresponding to an operation being performed by the mobile terminal 100 may be displayed on the display module 151. For example, when a camera menu is executed and the camera 121 begins to operate, a preview image viewer screen depicting a preview image provided by the camera 121 may be displayed on the display module 151.

When a TV menu is executed, a TV screen may be displayed on the display module 151. When a message menu is executed, a received message screen showing a list of received messages or a new message screen for writing a new message may be displayed on the display module 151.

If the touch input unit 159 is a touch screen, an auxiliary screen relevant to the operation screen may be displayed on the touch input unit 159. For example, referring to FIGS. 9a and 9b, when an idle screen is displayed on the display module 151, a command input menu 441 (FIG. 9a) or 442 (FIG. 9b), which includes a plurality of command keys, may be displayed on the touch input unit 159.

Figure 9A:
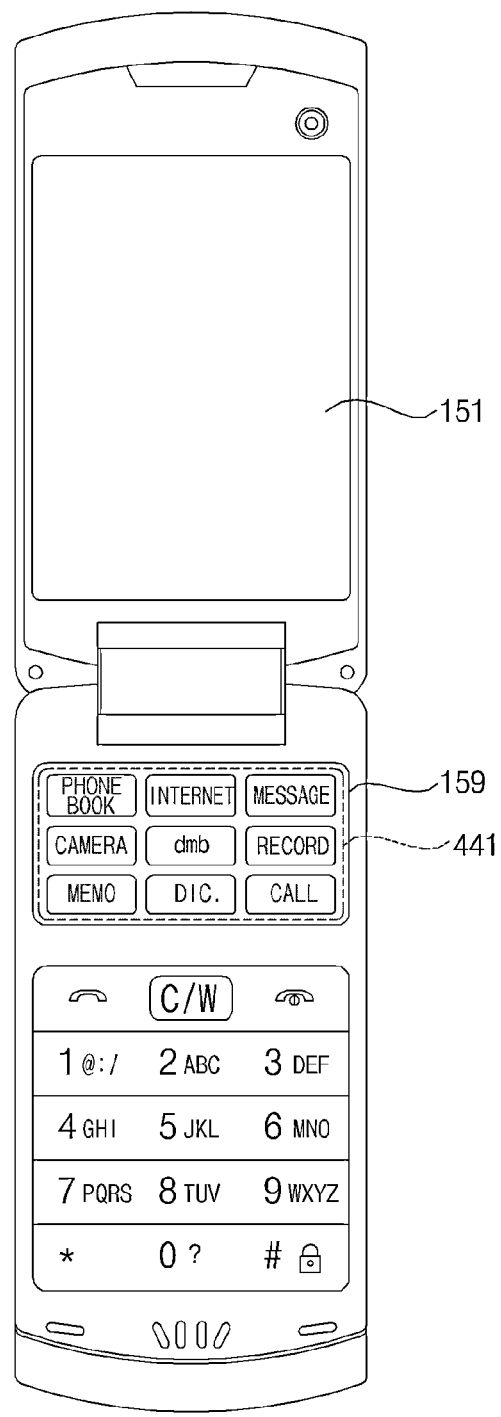
FIGS. 9a-9d depict diagrams of screens showing the operation of the mobile terminal shown in FIG. 1.
Figure 9B:
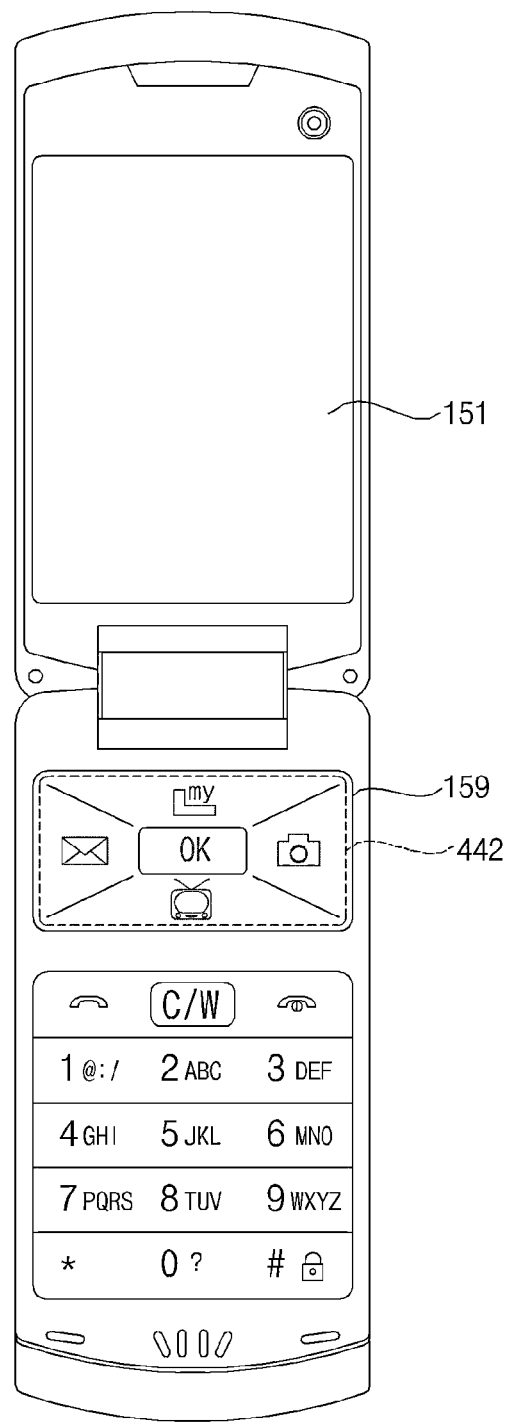
Figure 9C:
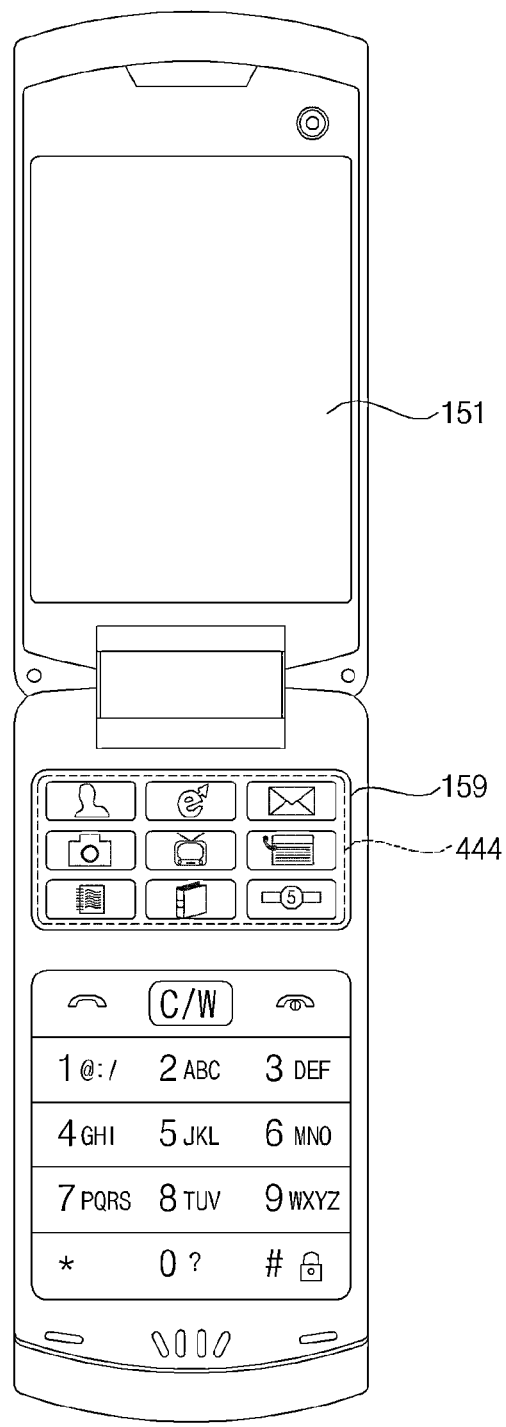
Figure 9D:
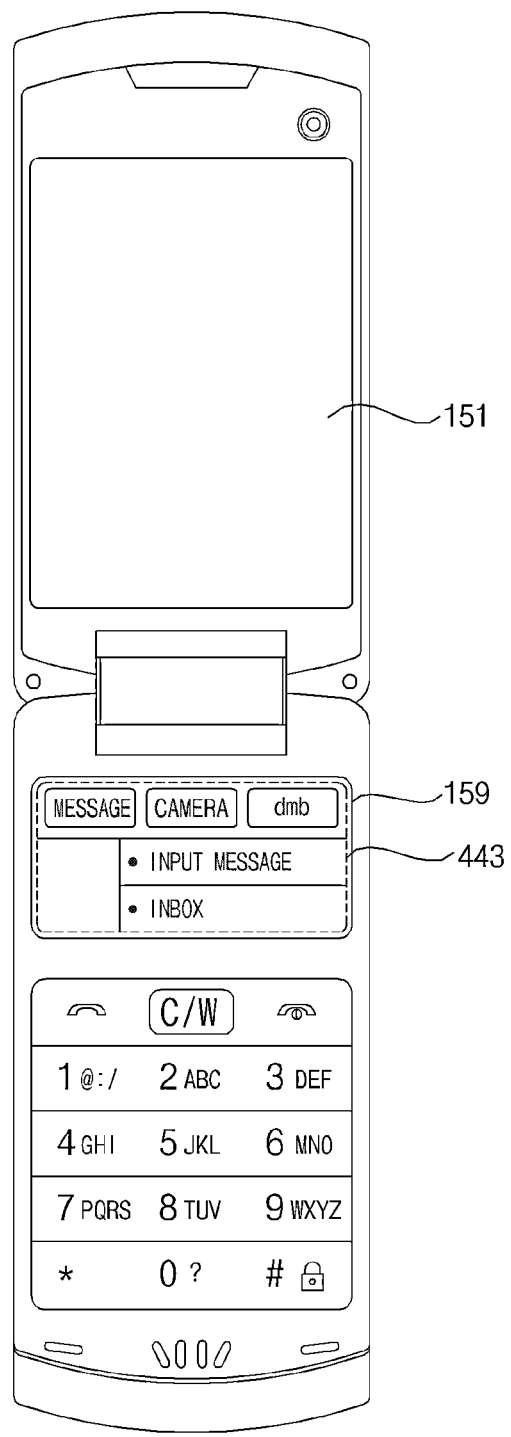

Alternatively, referring to FIG. 9c, when an idle screen is displayed on the display module 151, an icon menu 444 including a plurality of command keys or icons may be displayed on the touch input unit 159. The number and/or type of command keys or icons displayed on the touch input unit 159 may vary. Referring to FIG. 9*d*, when a predetermined operation screen is displayed on the display module 151, an auxiliary menu 443 corresponding to the predetermined operation screen may be displayed on the touch input unit 159.

FIGS. 10 through 18 illustrate diagrams of screens for explaining the operation of the mobile terminal 100 in response to a multi-touch signal input to the touch input unit 159. FIGS. 10*a* and 10*b* illustrate switching the touch input unit 159 from one input mode to another input mode in response to a multi-touch signal input to the touch input unit 159 and how to input a command to perform a predetermined operation. Referring to FIG. 10*a*, when an icon menu, an auxiliary menu or a command input menu including a plurality of command keys or icons is displayed on the touch input unit 159, a user may touch one of the command keys or icons, thereby selecting a predetermined operation represented by the touched command key or icon. The controller 180 performs the predetermined operation corresponding to the selected command key or icon and an operation screen displayed on the display module 151 (FIG. 2) changes accordingly.

Figure 10A:
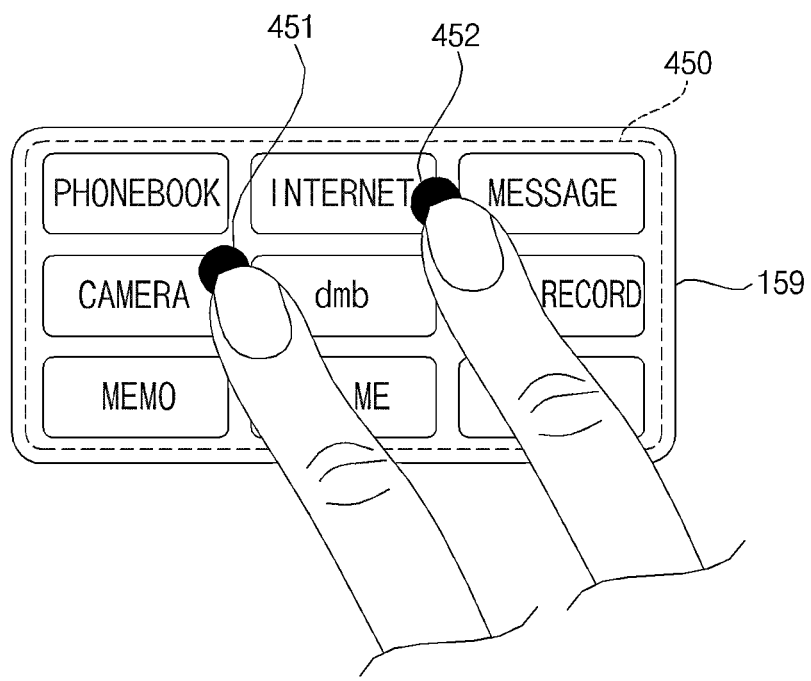
FIGS. 10 through 17 depict diagrams of screens for explaining the operation of the mobile terminal shown in FIG. 1 in response to a multi-touch signal input to the touch input unit shown in FIG. 1.
Figure 10B:

With continued reference to FIG. 10*a*, a command input menu 450 corresponding to an operation screen displayed on the display module 151 (FIG. 2) may be displayed on the touch input unit 159. When a multi-touch signal including multiple touches 451 and 452 is detected from the touch input unit 159, the controller 180 switches the touch input unit 159 from one input mode to another input mode. More specifically, if a multi-touch signal is detected from the touch input unit 159 (FIG. 10*a*), the controller 180 may switch the touch input unit 159 to the direction input mode (FIG. 10*b*).

In the direction input mode, an icon, such as a 'help' icon 156, may be displayed on the touch input unit 159. The 'help' icon 156 may be used for obtaining information in text form for aiding the user in response to a multi-touch signal, a touch signal or a gesture signal. If the 'help' icon 156 is touched, the help information may be displayed on the display module 151 (FIG. 2) or the touch input unit 159.

The touch input unit 159 may operate in one of two input modes, such as the normal mode and the direction input mode. The touch input unit 159 may be configured to operate in the normal mode during an initial powering-up of the mobile terminal 100. If the mobile terminal 100 is turned off and then turned back on, the mobile terminal 100 is configured to resume operating the touch input unit 159 in the normal mode or to operate in the direction input mode depending on settings in the mobile terminal 100. The touch input unit 159 may also be switched between the normal mode and the direction input mode in response to a touch signal or a multi-touch signal.

During the normal mode, an auxiliary screen relevant to an operation screen displayed on the display module 151 (FIG. 2) may be displayed on the touch input unit 159. The auxiliary screen may include a sub-menu, an auxiliary menu, a user-set menu or a 'most frequently used' menu.

The direction input mode is used for entering a command to scroll an operation screen displayed on the display module 151 or to move a cursor on the operation screen. A direction related to a touch signal, a multi-touch signal, or a drag signal detected from the touch input unit 159 may be provided to the controller 180.

Figure 11:
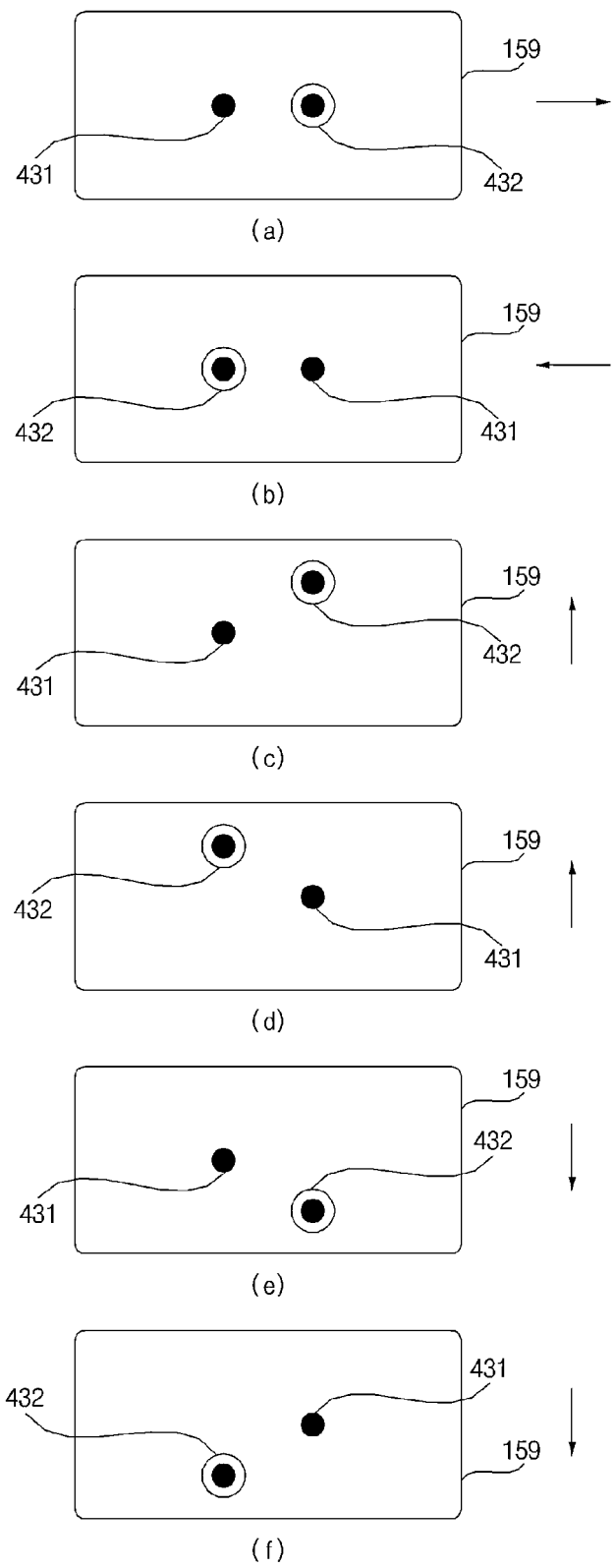

FIGS. 11(*a*) through 11(*f*) illustrate examples of determining a direction represented by a multi-touch signal detected from the touch input unit 159 when the touch input unit 159 is in the direction mode. More specifically, if multiple touches are detected from the touch input unit 159, the controller 180 may determine a direction represented by the multiple touches based on which of the multiple touches corresponds to a tap signal. The controller 180 may classify a touch signal into a long touch signal or a short touch signal, and may identify a series of short touch signals detected from the same position on the touch input unit 159 as a tap signal.

Referring to FIG. 11(*a*), when a multi-touch signal including a long touch signal 431 and a tap signal 432 is detected from two separate points on the touch input unit 159, the controller 180 determines a direction represented by the multi-touch signal based on the relative position of the tap signal 432 to the long touch signal 431. Since the two points depicted in FIG. 11(*a*) are located at substantially the same Y-coordinate on the touch input unit 159 and the tap signal 432 is detected to the right of the long touch signal 431, the controller 180 determines that a command to scroll an operation screen displayed on the display module 151 rightward or to move a cursor on the operation screen rightward has been input. The controller 180 scrolls the operation screen rightward or moves the cursor on the operation screen rightward in accordance with the multi-touch signal.

Referring to FIG. 11(*b*), if the tap signal 432 is detected to the left of the long touch signal 431 and at substantially the same Y-coordinate on the touch input unit 159, the controller 180 determines that a command to scroll the operation screen leftward or to move the cursor on the operation screen leftward has been input. The controller 180 scrolls the operation screen leftward or moves the cursor on the operation screen leftward in accordance with the multi-touch signal.

Referring to FIGS. 11(*a*) and 11(*b*), the controller 180 may determine that the two touch points 431, 432 of the multiple touches are positioned horizontal to each other when they are within a preset range of a Y-coordinate of the position of a first touch of the multiple touches. For example, when the two touch points 431, 432 from which the multiple touches are detected on the touch input unit 159 do not have the same Y-coordinate, the controller 180 determines that the two touch points are side by side horizontally if the difference between the Y-coordinates of the two touch points is within the preset range.

Referring to FIGS. 11(*c*) and 11(*d*), if the tap signal 432 is detected to be above and to the right or above and to the left of the long touch signal 431 (i.e., if the Y-coordinate of the touch point where the tap signal 432 is detected is determined to be above the preset range of the Y-coordinate of the touch point where the long touch signal 431 is detected), the controller 180 determines that a command to scroll the operation screen upward or to move the cursor on the operation screen upward has been input. The controller 180 scrolls the operation screen upward or moves the cursor on the operation screen upward in accordance with the multi-touch signal. The controller 180 may also scroll the operation screen upward to the right or upward to the left according to whether the tap signal 432 is located above the preset range of the Y-coordinate of the long touch signal 431 and to the right or to the left of an X-coordinate of the long touch signal 431.

Referring to FIGS. 11(*e*) and 11(*f*), if the tap signal 432 is detected to be below and to the right or below and to the left of the long touch signal 431 (i.e., if the Y-coordinate of the touch point where the tap signal 432 is detected is determined to be below the preset range of the Y-coordinate of the touch point where the long touch signal 431 is detected), the controller 180 determines that a command to scroll the operation screen downward or to move the cursor downward on the operation screen has been input. The controller 180 scrolls the operation screen downward or moves the cursor on the operation screen downward in accordance with the multi-touch signal. The controller 180 may also scroll the operation screen downward to the right or downward to the left according to whether the tap signal 432 is located below the preset range of the Y-coordinate of the long touch signal 431 and to the right or to the left of the X-coordinate of the long touch signal 431.

Figure 12:
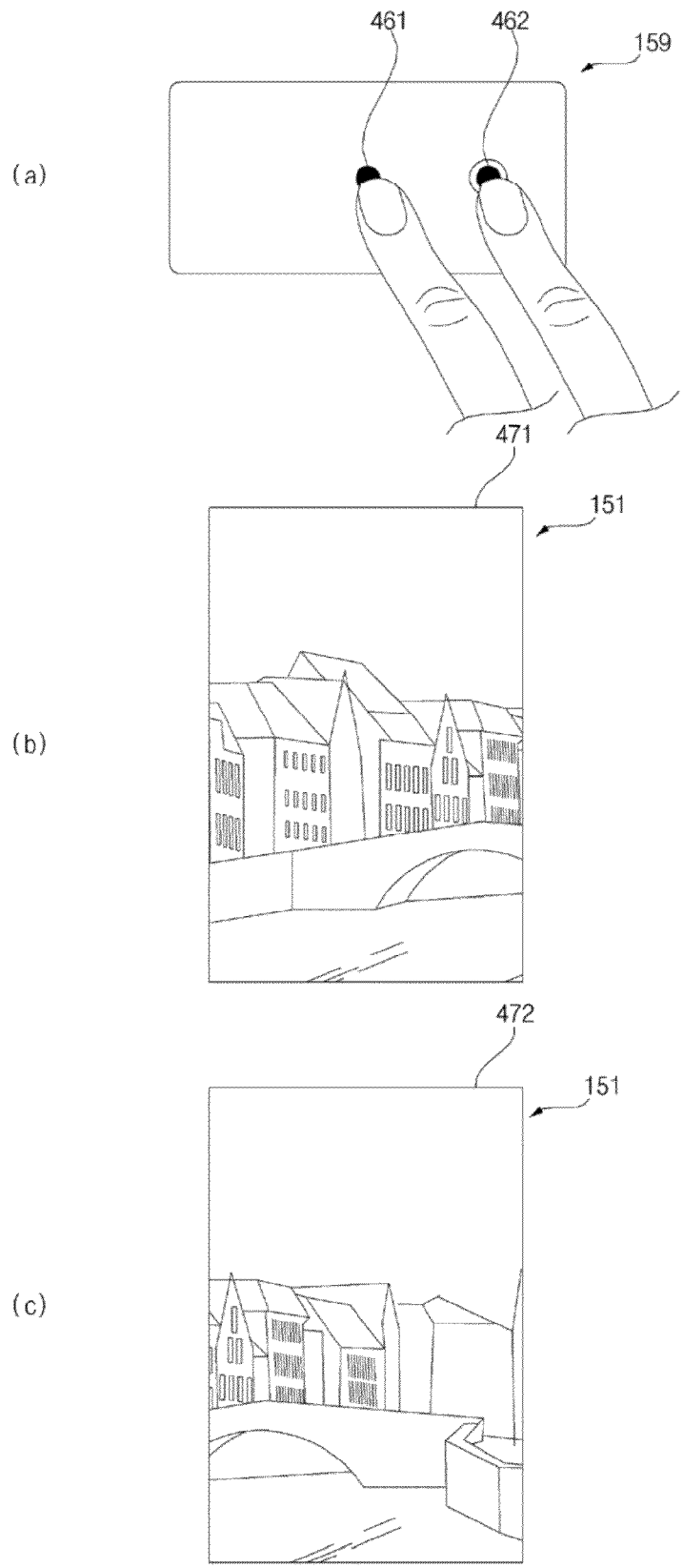

FIGS. 12(*a*) through 12(*c*) depict an example of diagrams of screens that can be displayed on the display module 151 during operation of the mobile terminal 100. Referring to FIGS. 12(*a*) through 12(*c*), when a multi-touch signal including a long touch signal 461 and a tap signal 462 is detected from the touch input unit 159 when the touch input unit 159 operates in the direction input mode, the controller 180 determines a direction represented by the multiple touches 461 and 462 based on the relative position of the tap signal 462 to the long touch signal 461.

Since the two points depicted in FIG. 12(*a*) have substantially the same Y-coordinates on the touch input unit 159 and the tap signal 462 is detected to the right of the of the long touch signal 461, the controller 180 determines that a command to scroll a first screen 471 (FIG. 12(*b*)) displayed on the display module 151 rightward has been input and scrolls the first screen 471 rightward. As a result, a second screen 472 (FIG. 12(*c*)) may be displayed on the display module 151. More particularly, when a multi-touch signal including the long touch signal 461 and the tap signal 462 is detected from the touch input unit 159 while the first screen 471 is displayed on the display module 151, the second screen 472 may be displayed on the display module 151 in response to the multi-touch signal.

Figure 13:
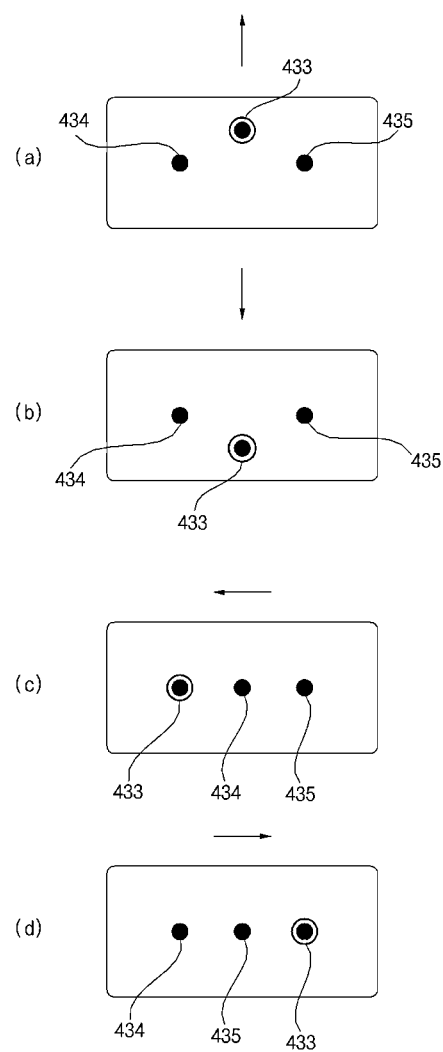

FIGS. 13(*a*) through 13(*d*) illustrate another example of determining a direction represented by a multi-touch signal detected from the touch input unit 159. Referring to FIGS. 13(*a*) through 13(*d*), when a multi-touch signal is generated by touching at least three points on the touch input unit 159 at the same time, the controller 180 determines a direction represented by the multi-touch signal based on the location of the touch point where a tap signal included in the multi-touch signal is detected, the shape of the figure formed by the at least three touch points, and the relative positions of the at least three touch points.

Referring to FIG. 13(*a*), when a multi-touch signal including a tap signal 433 and two ordinary touch signals 434, 435 is detected from three points on the touch input unit 159 with the tap signal 433 detected between the touch points where the two ordinary touch signals 434, 435 are respectively detected and the Y-coordinate of the touch point where the tap signal 433 is detected is above the Y-coordinates of the touch points where the two ordinary touch signals 434, 435 are respectively detected, the controller 180 determines that a command to scroll an operation screen displayed on the display module 151 upward or move a cursor on the operation screen upward has been input. Referring to FIG. 13(*b*), when the tap signal 433 is detected between the touch points where the two ordinary touch signals 434, 435 are respectively detected and the Y-coordinate of the touch point where the tap signal 433 is detected is below the Y-coordinates of the touch points where the two ordinary touch signals 434, 435 are respectively detected, the controller 180 determines that a command to scroll an operation screen displayed on the display module 151 downward or to move a cursor on the operation screen downward has been input.

Referring to FIG. 13(*c*), when the tap signal 433 is detected to the left of the two ordinary touch signals 434, 435, the controller 180 determines that a command to scroll the operation screen leftward or to move the cursor leftward on the operation screen has been input. Referring to FIG. 13(*d*), when the tap signal is detected to the right of the two ordinary touch signals 434, 435, the controller 180 determines that a command to scroll the operation screen rightward or to move the cursor rightward on the operation screen has been input.

With continuing reference to FIGS. 13(*a*) through 13(*d*), when three points on the touch input unit 159 are touched at the same time, the controller 180 scrolls a screen displayed on the display module 151 or moves a cursor on the screen leftward, rightward, upward or downward in the same manner used when two points on the touch input unit 159 are touched at the same time, as shown in FIGS. 12(*a*) and 12(*b*). When the multi-touch signal is detected from the touch input unit 159 for more than a predefined amount of time, the controller 180 may continuously scroll the operation screen displayed on the display module 151 until the multi-touch signal is no longer detected.

Figure 14:
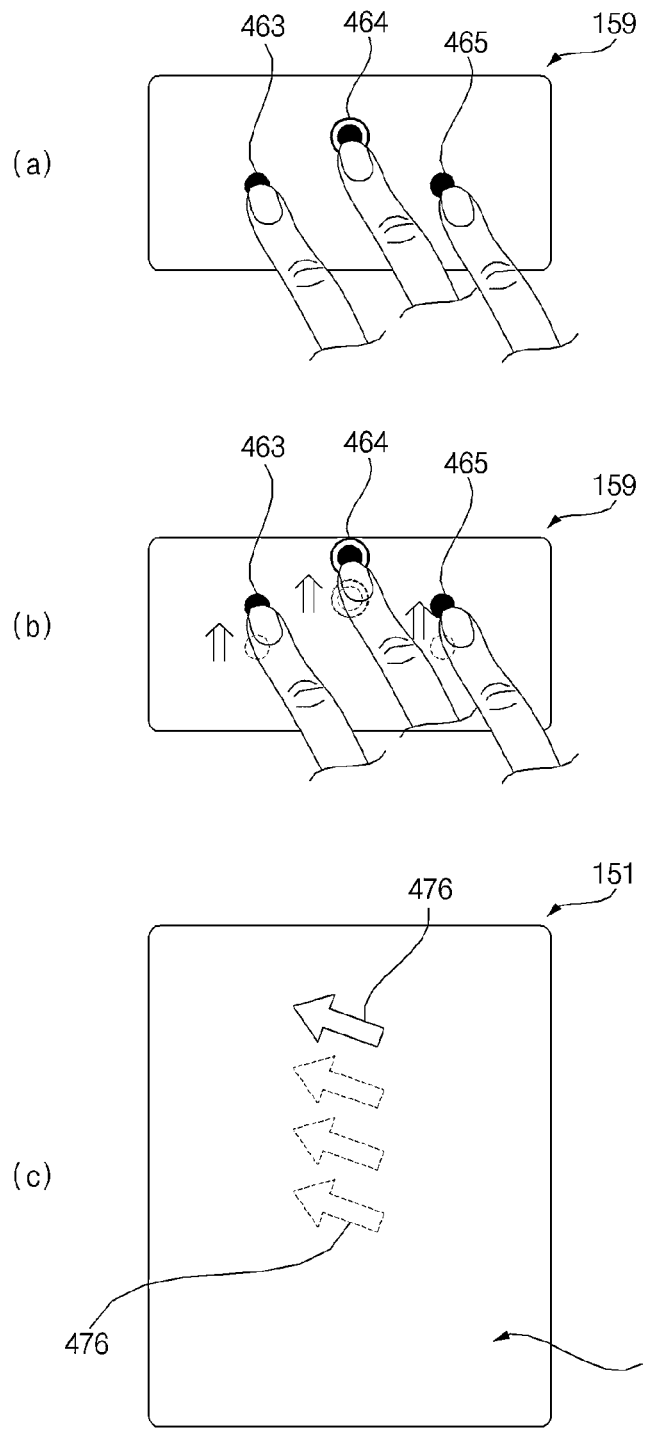

FIGS. 14(*a*) through 14(*c*) illustrate another example of determining a direction represented by a multi-touch signal detected from the touch input unit 159. Referring to FIGS. 14(*a*) through 14(*c*), when multiple touches including a tap signal are detected from the touch input unit 159, the controller 180 determines a direction represented by the multiple touches based on the tap signal.

Thereafter, if a drag signal is detected from the touch input unit 159, the controller 180 incrementally scrolls an operation screen displayed on the display module 151 or moves a cursor on the operation screen in a direction corresponding to the drag signal. The controller 180 also incrementally scrolls the operation screen or moves the cursor on the operation screen in a direction corresponding to the drag signal when the drag signal is detected from the touch input unit 159 after the detection of a multi-touch signal that does not include a tap signal. The amount by which the operation screen or the cursor on the operation screen is scrolled or moved is determined by the distance or the duration of the drag across the touch input unit 159.

For example, when multiple touches 463, 464 and 465 are detected from the touch input unit 159 and one touch 464 is determined to be a tap signal, as shown in FIG. 14(*a*), the controller 180 determines that the multiple touches 463, 464 and 465 represent an upward direction. Then, if multiple drags 466, 467 and 468 are detected from the touch input unit 159, as shown in FIG. 14(*b*), the controller 180 incrementally moves the cursor 476 upward, as illustrated in FIG. 14(*c*).

Figure 15:
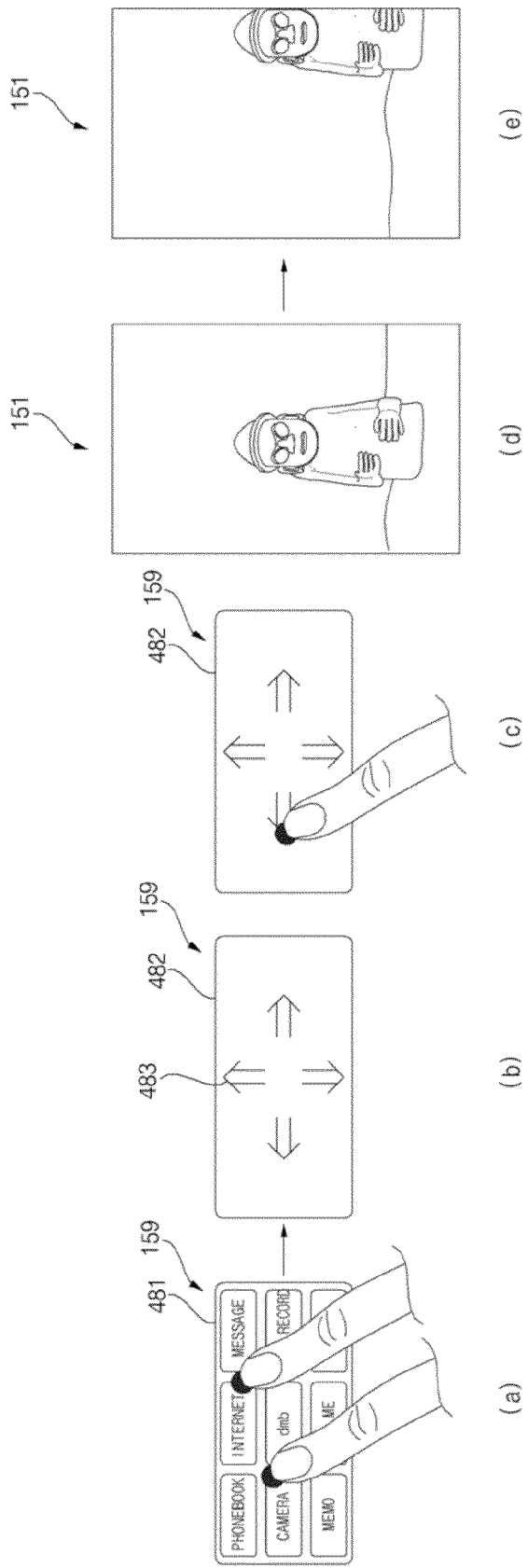

FIGS. 15(*a*) through 15(*e*) illustrate another example of determining a direction represented by a multi-touch signal detected from the touch input unit 159. Referring to FIGS. 15(*a*) and 15(*b*), the touch input unit 159 is switched from the normal mode (FIG. 15(*a*)) to the direction mode (FIG. 15(*b*)) in response to a multi-touch signal (FIG. 15(*a*)) detected on the touch input unit 159.

Referring to FIG. 15(*a*), a command input menu 481 is displayed on the touch input unit 159. A direction input menu 482 may be displayed on the touch input unit 159 (FIG. 15(*b*)) in response to the multi-touch signal detected on the touch input unit 159 when the touch input unit 159 is in the normal mode. Referring to FIG. 15(*b*), the direction input menu 482 may include a plurality of direction icons 483 for entering a direction, and the direction icons 483 may be displayed as arrows.

Referring to FIGS. 15(*c*) through 15(*e*), when a touch signal (FIG. 15(*c*)) for selecting one of the direction icons 483 is detected from the touch input unit 159, the controller 180 determines a direction represented by the touch signal and scrolls an operation screen displayed on the display module 151 in the determined direction, as indicated in FIG. 15(d) and FIG. 15(e). Similarly, when a multi-touch signal is detected from the touch input unit 159, as shown in FIGS. 11, 13 and 14, while the second direction input menu 482 is displayed on the touch input unit 159, the controller 180 can also determine a direction represented by the multi-touch signal and scroll the operation screen displayed on the display module 151 in the determined direction.

Figure 16:
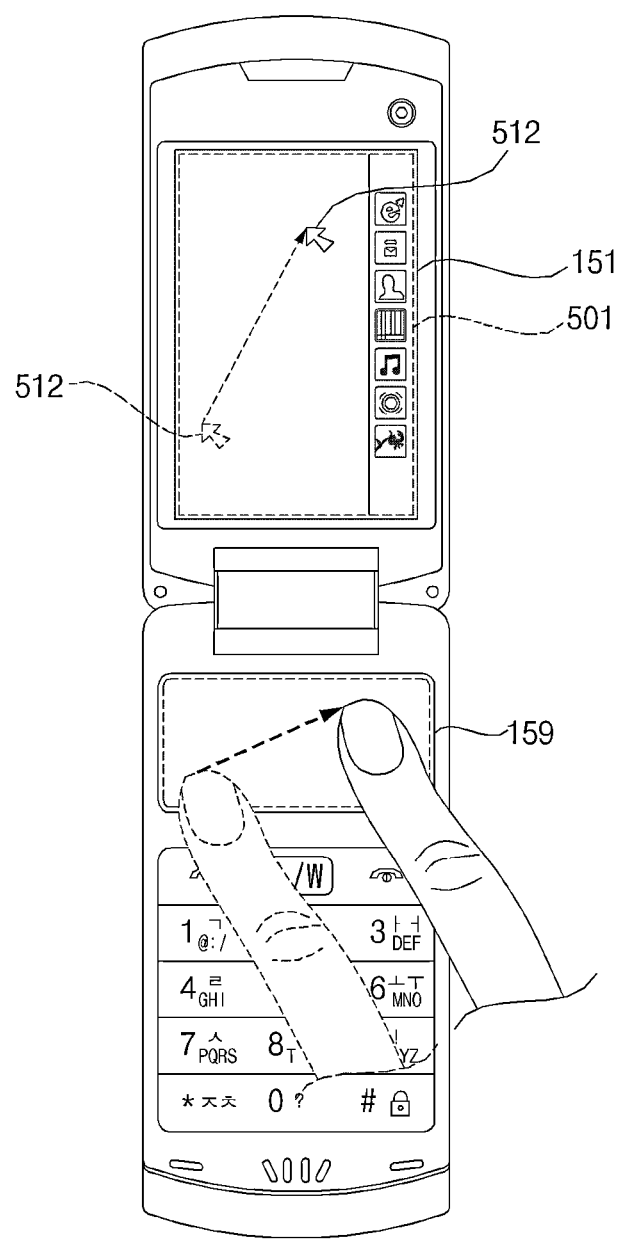
Figure 17:
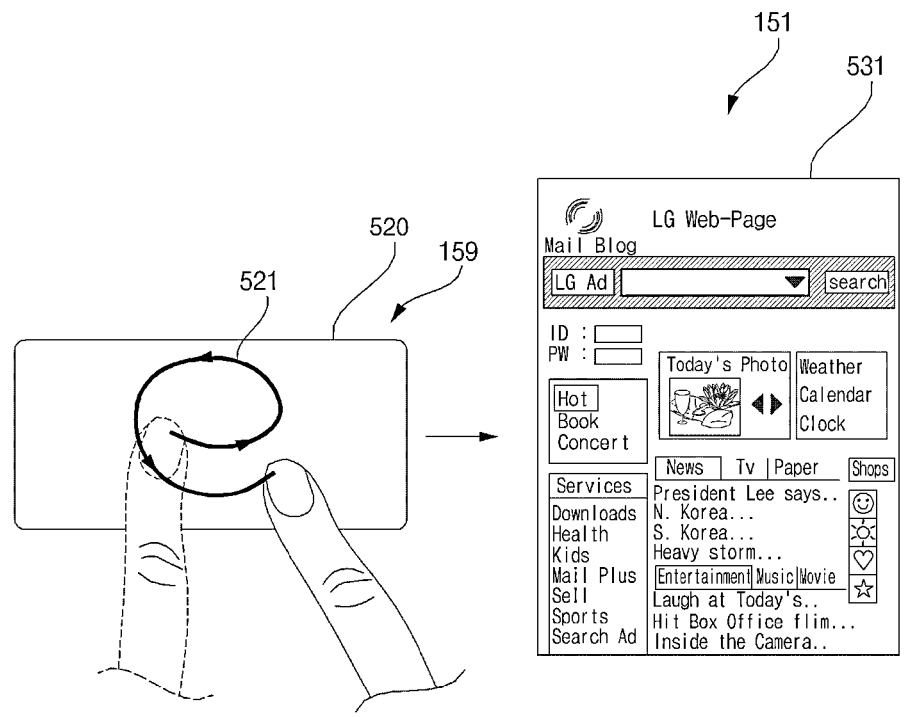
Figure 17:
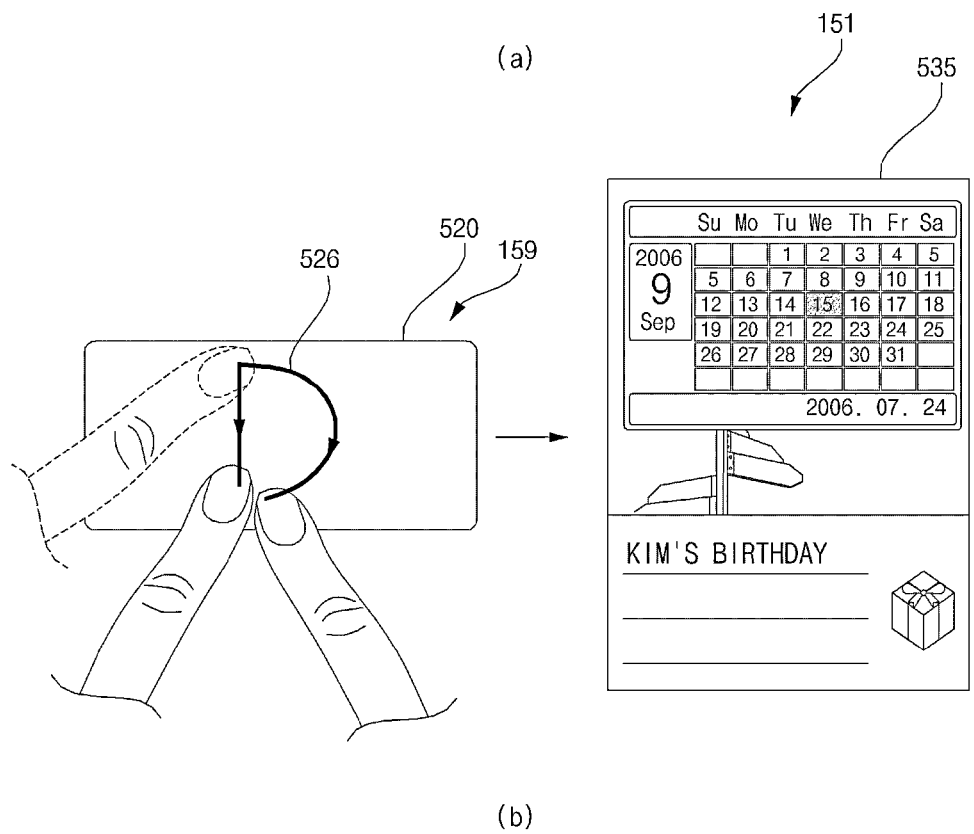
Figure 18:
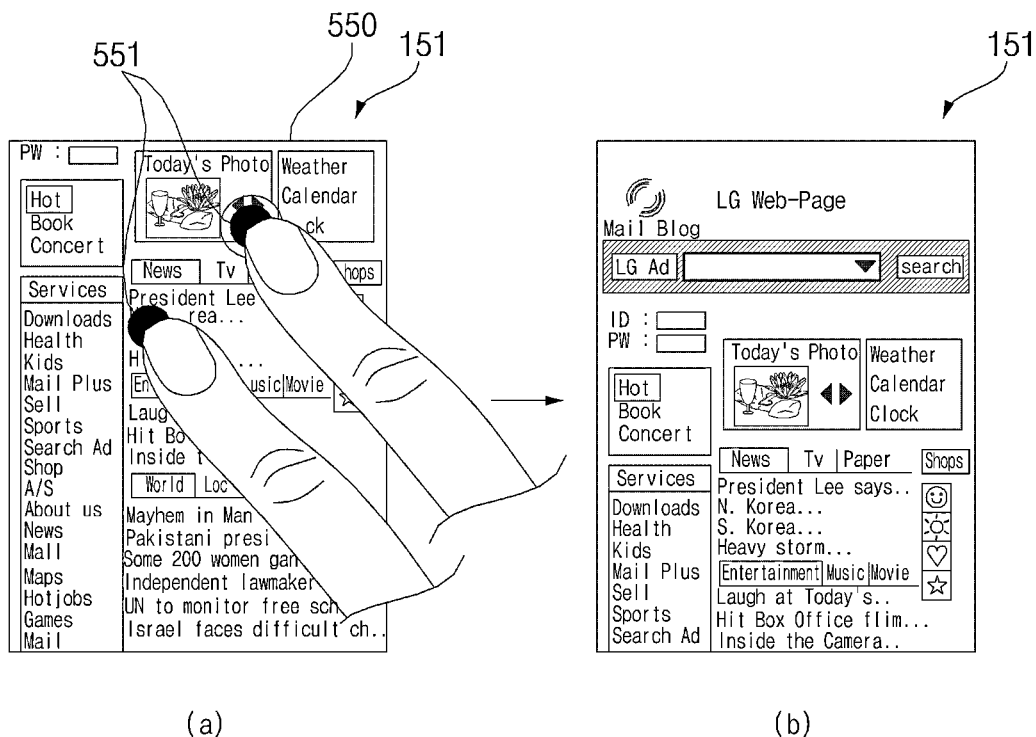
FIG. 18 depicts diagrams of screens for explaining the operation of the mobile terminal shown in FIG. 1 in response to a multi-touch signal input to the display module shown in FIG. 1.

FIG. 16 illustrates an example of a touch input menu that can be displayed on the display module 151. Referring to FIG. 16, when a multi-touch signal is detected from the touch input unit 159, the controller 180 may switch the touch input unit 159 to the direction input mode depending on the operating state of the mobile terminal 100, and may display a touch input menu 501 on the display module 151.

Thereafter, if a touch signal and then a drag signal are detected from the touch input unit 159, the controller 180 identifies a drag direction corresponding to the drag signal and may move a cursor 512 displayed on the display module 151 in the identified drag direction. If another touch signal is detected from the touch input unit 159, the controller 180 may select a command key or an icon currently being pointed at by the cursor 512, may perform an operation corresponding to the selected command key or icon, and may display an operation screen relevant to the operation on the display module 151.

FIGS. 17(a) through 17(d) illustrate an example of a gesture input menu that can be displayed on the touch input unit 159. Referring to FIGS. 17(a) and 17(c), when a multi-touch signal is detected from the touch input unit 159, the controller 180 may switch the input mode of the touch input unit 159 depending on the operating state of the mobile terminal 100 and may display a gesture input menu 520 on the touch input unit 159.

Referring to FIG. 17(a), if a touch and drag signal is detected from the touch input unit 159 when the gesture input menu 520 is displayed on the touch input unit 159, the controller 180 may recognize the pattern of a gesture 521 represented by the touch and drag signal. A plurality of gesture patterns may be registered and stored in the memory 160 in advance. The controller 180 searches the memory 160 for a gesture pattern that matches the gesture 521 and performs an operation corresponding to the identified gesture pattern. For example, if the gesture 521 has an e-shaped pattern, as depicted in FIG. 17(a), a browser for accessing the Internet may be executed and an Internet search screen 531 (FIG. 17(b)) may be displayed on the display module 151.

The gesture patterns stored in the memory 160 may be associated with the addresses of websites. If a gesture is detected from the touch input unit 159, the controller 180 may search the memory 160 for a gesture pattern that matches the detected gesture and access a website corresponding to the identified gesture pattern.

FIG. 17(c) illustrates another example of a drag being detected from the touch input unit 159 while the gesture input menu 520 is displayed on the touch input unit 159. In FIG. 17(c), the controller 180 may recognize a D-shaped pattern of a gesture 526 represented by the drag and the controller 180 may display a menu corresponding to the D-shaped gesture pattern, such as a calendaring menu 535 (FIG. 17(d)), on the display module 151.

FIGS. 18(a) and 18(b) illustrate screens that can be displayed on the display module 151 in response to a multi-touch signal input to the display module 151. Referring to FIGS. 18(a) and 18(b), if the display module 151 is a full touch screen and a multi-touch signal is detected from the display module 151, the controller 180 may scroll an operation screen displayed on the display module 151 in accordance with the multi-touch signal. More specifically, if a multi-touch signal 551 is detected from the display module 151 when an Internet search screen 550 (FIG. 18(a)) is displayed on the display module 151, the controller 180 determines a direction represented by the multi-touch signal and scrolls the Internet search screen 550 in the determined direction.

For example, if a multi-touch signal having the pattern shown in FIG. 13(a) is detected from the Internet search screen 550 (FIG. 18(a)), the controller 180 determines that a direction represented by the multi-touch signal is an upward direction and scrolls the Internet search screen 550 upwardly, as illustrated in FIG. 18(b). Alternatively, the Internet search screen 550 (FIG. 18(a)) may be scrolled only when the multi-touch signal is detected for more than a predefined amount of time. As another alternative, if a multi-touch and drag signal is detected from the display module 151, the controller 180 may recognize the pattern of a gesture represented by the multi-touch and drag signal and perform an operation corresponding to the recognized gesture pattern.

According to the present invention, it is possible to scroll an operation screen displayed on a display module of a mobile terminal or move a cursor on the operation screen in response to a multi-touch signal detected by a touch input unit of the mobile terminal. Additionally, when a drag signal is detected by the touch input unit, the controller may recognize the pattern of a gesture represented by the drag signal and perform an operation corresponding to the recognized gesture pattern.

The mobile terminal and the operating method thereof according to the present are not restricted to the exemplary embodiments set forth herein. Variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operating a mobile terminal, the method comprising:
operating a touch input unit of the mobile terminal in a normal mode, wherein the touch input unit is separate from a display of the mobile terminal, the display configured to display a first screen, and the touch input unit comprising a touch screen configured to display a second screen relevant to the first screen, the second screen including a menu, the menu having at least one selectable item, each of the at least one selectable item not being displayed on the display of the mobile terminal and related to an operation of the mobile terminal;

detecting a touch signal received on the second screen of the touch input unit while the touch input unit is in the normal mode;

determining whether the detected touch signal is a single touch signal or a first multi-touch signal, the single touch signal related to selection of one item of the at least one selectable item;

executing an operation corresponding to the one item of the at least one selectable item when the detected touch signal is the single touch signal;

switching the touch input unit from the normal mode to a direction input mode when the detected touch signal is the first multi-touch signal;

ceasing displaying the menu on the second screen of the touch input unit when switching the touch input unit from the normal mode to the direction input mode;

detecting a second multi-touch signal on the second screen of the touch input unit while the touch input unit is in the direction input mode, the second multi-touch signal including a long touch signal detected at a first position on the second screen of the touch input unit and a tap signal detected simultaneously with the long touch signal at a second position on the second screen of the touch input unit;

determining a direction represented by the second multi-touch signal based on a relative position of the second position on the second screen of the touch input unit in comparison to the first position on the second screen of the touch input unit when the tap signal is detected; and scrolling at least one object displayed on the first screen of the display in the determined direction.

2. The method of claim 1, further comprising:
detecting a second touch signal from the touch input unit while the touch input unit is in the direction input mode, the second touch signal comprising a touch signal for more than a predefined amount of time, a drag signal with a predetermined pattern or a tap signal from a predefined part of the touch input unit; and
switching the touch input unit back to the normal mode in response to the detection of the second touch signal.

3. The method of claim 1, wherein detecting at least the first multi-touch signal or the second multi-touch signal comprises:
identifying a touch signal as a long touch signal or a short touch signal; and
classifying a series of short touch signals detected on the same position on the touch input unit as a tap signal.

4. The method of claim 1, further comprising:
displaying at least one selectable item on the second screen of the touch input unit during the direction input mode;
detecting a touch input received via the second screen of the touch input unit, the touch input related to selection of one item of the at least one selectable item on the second screen; and
displaying, on the display or on the touch screen of the mobile terminal, information related to the selected one item of the at least one selectable item on the second screen in response to detecting the touch input.

5. The method of claim 1, further comprising:
displaying a direction key on the second screen of the touch input unit during the direction input mode, the direction key configured to receive a selection of a direction in which to scroll the first screen of the display.

6. The method of claim 1, further comprising displaying, on the second screen of the touch input unit, at least an auxiliary screen or a sub-menu screen relevant to the first screen of the display during the normal mode.

7. The method of claim 1, further comprising:
displaying a plurality of command keys or icons on the first screen of the display;
detecting a second touch signal from the touch input unit during the normal mode;
selecting one command key of the plurality of command keys or icons in response to the second touch signal; and
performing an operation corresponding to the selected command key or icon.

8. The method of claim 1, further comprising:
detecting a gesture signal on the touch input unit;
performing an operation corresponding to the gesture signal; and
displaying a third screen relevant to the operation on the display.

9. The method of claim 1, wherein:
the determined direction is a rightward direction when the second position is to the right of the first position and within a preset range of a Y-coordinate of the first position;
the determined direction is a leftward direction when the second position is to the left of the first position and within the preset range of the Y-coordinate of the first position;
the determined direction is an upward direction when the second position is above the preset range of the Y-coordinate of the first position and also above and to the right of the first position or above and to the left of the first position; and
the determined direction is a downward direction when the second position is below the preset range of the Y-coordinate of the first position and also below and to the right of the first position or below and to the left of the first position.

10. The method of claim 1, further comprising:
switching the mobile terminal off when the touch input unit is in the normal mode or in the direction mode; and
switching the mobile terminal back on,
wherein the touch input unit resumes in the normal mode when the mobile terminal is switched back on if the touch input unit was in the normal mode when the mobile terminal was switched off, and
wherein the touch input unit resumes in the direction mode when the mobile terminal is switched back on if the touch input unit was in the direction mode when the mobile terminal was switched off.

11. The method of claim 1, wherein a touch of the first multi-touch signal is received on an item of the at least one selectable item.

12. A mobile terminal, comprising:
a display configured to display at least one object on a first screen of the display;
a touch input unit separate from the display and comprising a touch screen configured to receive a touch input and to display a second screen relevant to the first screen of the display, the second screen including a menu, the menu having at least one selectable item, each of the at least one selectable item not being displayed on the display of the mobile terminal and related to an operation of the mobile terminal; and
a controller configured to:
detect a touch signal received on the second screen of the touch input unit while the touch input unit is in a normal mode;

determine whether the detected touch signal is a single touch signal or a first multi-touch signal, the single touch signal related to selection of one item of the at least one selectable item;

execute an operation corresponding to the one item of the at least one selectable item when the detected touch signal is the single touch signal;

switch the touch input unit from the normal mode to a direction input mode when the detected touch signal is the first multi-touch signal, control the touch input unit to cease displaying the menu on the second screen of the touch input unit when switching the touch input unit from the normal mode to the direction input mode;

detect receipt of a second multi-touch signal on the second screen of the touch input unit while the touch input unit is in the direction input mode, the second multi-touch signal including a long touch signal detected at a first position on the second screen of the touch input unit and a tap signal detected simultaneously with the long touch signal at a second position on the second screen of the touch input unit;

determine a direction represented by the second multi-touch signal based on a relative position of the second position second screen of the on the touch input unit in comparison to the first position on the second screen of the touch input unit when the tap signal is detected; and control the display to scroll the at least one object displayed on the first screen of the display in the determined direction.

13. The mobile terminal of claim 12, wherein the controller is further configured to:

identify a touch signal as a long touch signal or a short touch signal;

classify a series of short touch signals detected on the same position on the touch input unit as a tap signal, and determine the direction represented by the second multi-touch signal based on a location of the detected tap signal included in the second multi-touch signal.

14. The mobile terminal of claim 12, wherein:

the touch input unit is further configured to detect a second touch signal while the touch input unit is in the direction input mode, the second touch signal comprising a touch signal for more than a predefined amount of time, a drag signal with a predetermined pattern or a tap signal from a predefined part of the touch input unit; and the controller is further configured to switch the touch input unit back to the normal mode in response to the detection of the second touch signal.

15. The mobile terminal of claim 12, wherein:

the determined direction is a rightward direction when the second position is to the right of the first position and within a preset range of a Y-coordinate of the first position;

the determined direction is a leftward direction when the second position is to the left of the first position and within the preset range of the Y-coordinate of the first position;

the determined direction is an upward direction when the second position is above the preset range of the Y-coordinate of the first position and also above and to the right of the first position or above and to the left of the first position; and the determined direction is a downward direction when the second position is below the preset range of the Y-coordinate of the first position and also below and to the right of the first position or below and to the left of the first position.

16. The mobile terminal of claim 12, wherein the touch input unit is configured to:

resume in the normal mode when the mobile terminal is switched back on if the touch input unit was in the normal mode when the mobile terminal was switched; and resume in the direction mode when the mobile terminal is switched back on if the touch input unit was in the direction mode when the mobile terminal was switched off.

17. The mobile terminal of claim 12, wherein a touch of the first multi-touch signal is received on an item of the at least one selectable item.

18. A method of operating a mobile terminal, the method comprising:

operating a touch input unit of the mobile terminal in a normal mode, wherein the touch input unit is separate from a display of the mobile terminal, the display configured to display a first screen, and the touch input unit comprising a touch screen configured to display a second screen relevant to the first screen, the second screen including a menu, the menu having at least one selectable item, each of the at least one selectable item not being displayed on the display of the mobile terminal and related to an operation of the mobile terminal;

detecting touch signal received on the second screen of the touch input unit while the touch input unit is in the normal mode;

determining whether the detected touch signal is a single touch signal or a first multi-touch signal, the single touch signal related to selection of one item of the at least one selectable item;

executing an operation corresponding to the one item of the at least one selectable item when the detected touch signal is the single touch signal;

switching the touch input unit from the normal mode to a direction input mode when the detected touch signal is the first multi-touch signal;

ceasing displaying the menu on the second screen of the touch input unit when switching the touch input unit from the normal mode to the direction input mode;

detecting a second multi-touch signal on the second screen of the touch input unit while the touch input unit is in the direction input mode, the second multi-touch signal including a drag signal;

determining a direction represented by the second multi-touch signal based on a direction of the drag signal; and scrolling at least one object displayed on the first screen of the display in the determined direction in response to detection of the drag signal of the second multi-touch signal or moving a cursor on the first screen of the display in the determined direction in response to detection of the drag signal of the second multi-touch signal, wherein an amount by which the at least one object is scrolled or the cursor is moved is based on a dragged distance of the drag signal across the touch input unit.

19. The method of claim 18, further comprising:

displaying at least one selectable item on the second screen of the touch input unit during the direction input mode;

selecting one of the at least one selectable item; and displaying, on the display or on the touch screen of the mobile terminal, information related to the selected one of the at least one selectable item on the second screen in response to the selection.

20. The method of claim 18, further comprising:
displaying a direction key on the second screen of the touch input unit during the direction input mode, the direction key configured to receive selection of a direction in which to scroll the at least one object displayed on the first screen of the display or to move the cursor on the first screen.

21. The method of claim 18, further comprising displaying, on the second screen, at least an auxiliary screen or a sub-menu screen relevant to the first screen of the display during the normal mode.

22. The method of claim 18, wherein a touch of the first multi-touch signal is received on an item of the at least one selectable item.

23. A mobile terminal, comprising:
a display configured to display at least one object on a first screen of the display;
a touch input unit separate from the display and comprising a touch screen configured to receive a touch input and to display a second screen relevant to the first screen of the display, the second screen including a menu, the menu having at least one selectable item, each of the at least one selectable item not being displayed on the display of the mobile terminal and related to an operation of the mobile terminal; and
a controller configured to:
detect a touch signal received on the second screen of the touch input unit while the touch input unit is in a normal mode;
determine whether the detected touch signal is a single touch signal or a first multi-touch signal, the single touch signal related to selection of one item of the at least one selectable item;
execute an operation corresponding to the one item of the at least one selectable item when the detected touch signal is the single touch signal;
switch the touch input unit from the normal mode to a direction input mode when the detected touch signal is the first multi-touch signal,
control the touch input unit to cease displaying the menu on the second screen of the touch input unit when switching the touch input unit from the normal mode to the direction input mode;
detect receipt of a second multi-touch signal on the second screen of the touch input unit while the touch input unit is in the direction input mode, the second multi-touch signal including a drag signal;
determine a direction represented by the second multi-touch signal based on a direction of the drag signal; and
control the display to scroll the at least one object displayed on the first screen of the display in the determined direction in response to detection of the drag signal of the second multi-touch signal or to move a cursor on the first screen of the display in the determined direction in response to detection of the drag signal of the second multi-touch signal,
wherein an amount by which the at least one object is scrolled or the cursor is moved is based on a dragged distance of the drag signal across the touch input unit.

24. The mobile terminal of claim 23, wherein a touch of the first multi-touch signal is received on an item of the at least one selectable item.

25. A method of operating a mobile terminal, the method comprising:
operating a touch input unit of the mobile terminal in a normal mode, wherein the touch input unit is separate from a display of the mobile terminal, the display configured to display a first screen, and the touch input unit comprising a touch screen configured to display a second screen relevant to the first screen, the second screen including a menu, the menu having at least one selectable item, each of the at least one selectable item not being displayed on the display of the mobile terminal and related to an operation of the mobile terminal;
detecting touch signal received on the second screen of the touch input unit while the touch input unit is in the normal mode;
determining whether the detected touch signal is a single touch signal or a first multi-touch signal, the single touch signal related to selection of one item of the at least one selectable item;
executing an operation corresponding to the one item of the at least one selectable item when the detected touch signal is the single touch signal;
switching the touch input unit from the normal mode to a direction input mode when the detected touch signal is the first multi-touch signal;
ceasing displaying the menu on the second screen of the touch input unit when switching the touch input unit from the normal mode to the direction input mode;
detecting a second multi-touch signal on the second screen of the touch input unit while the touch input unit is in the direction input mode, the second multi-touch signal including a long touch signal detected at a first position on the second screen of the touch input unit and a tap signal detected simultaneously with the long touch signal at a second position on the second screen of the touch input unit;
determining a direction represented by the second multi-touch signal based on a relative position of the second position on the second screen of the touch input unit in comparison to the first position on the second screen of the touch input unit when the tap signal is detected; and
moving a cursor on the first screen of the display in the determined direction.

26. The method of claim 25, further comprising:
displaying a direction key on the second screen of the touch input unit during the direction input mode, the direction key configured to receive a selection of a direction in which to scroll the first screen of the display.

27. The method of claim 25, wherein a touch of the first multi-touch signal is received on an item of the at least one selectable item.

28. A mobile terminal, comprising:
a display configured to display at least one object on a first screen of the display;
a touch input unit separate from the display and comprising a touch screen configured to receive a touch input and to display a second screen relevant to the first screen of the display, the second screen including a menu, the menu having at least one selectable item, each of the at least one selectable item not being displayed on the display of the mobile terminal and related to an operation of the mobile terminal; and
a controller configured to:
detect a touch signal received on the second screen of the touch input unit while the touch input unit is in a normal mode;
determine whether the detected touch signal is a single touch signal or a first multi-touch signal, the single touch signal related to selection of one item of the at least one selectable item;

execute an operation corresponding to the one item of the at least one selectable item when the detected touch signal is the single touch signal;

switch the touch input unit from the normal mode to a direction input mode when the detected touch signal is the first multi-touch signal, control the touch input unit to cease displaying the menu on the second screen of the touch input unit when switching the touch input unit from the normal mode to the direction input mode;

detect receipt of a second multi-touch signal on the second screen of the touch input unit while the touch input unit is in the direction input mode, the second multi-touch signal including a long touch signal detected at a first position on the second screen of the touch input unit and a tap signal detected simultaneously with the long touch signal at a second position on the second screen of the touch input unit;

determine a direction represented by the second multi-touch signal based on a relative position of the second position on the second screen of the touch input unit in comparison to the first position on the second screen of the touch input unit when the tap signal is detected; and control the display to move a cursor on the first screen of the display in the determined direction.

29. The mobile terminal of claim 28, wherein a touch of the first multi-touch signal is received on an item of the at least one selectable item.

* * * * *